US012561740B2

(12) United States Patent
Schlicher et al.

(10) Patent No.: US 12,561,740 B2
(45) Date of Patent: Feb. 24, 2026

(54) METHOD, SYSTEM AND COMPUTER PROGRAM PRODUCT FOR REQUESTING FINANCE FROM MULTIPLE EXCHANGE AND DIGITAL FINANCE SYSTEMS

(71) Applicant: AVC Innovations LLC, Spearfish, SD (US)

(72) Inventors: Bob G. Schlicher, Knoxville, TN (US); David J. Todd, Spearfish, SD (US); Niels C. Skjoldager, Seminole, FL (US); Shaikha Dheya Ebrahim Al Khalifa, Manama (BH)

(73) Assignee: AVC Innovations LLC, Spearfish, SD (US)

( * ) Notice: Subject to any disclaimer, the term of this patent is extended or adjusted under 35 U.S.C. 154(b) by 71 days.

(21) Appl. No.: 18/600,623

(22) Filed: Mar. 8, 2024

(65) Prior Publication Data

US 2025/0022052 A1    Jan. 16, 2025

Related U.S. Application Data

(60) Provisional application No. 63/526,983, filed on Jul. 15, 2023.

(51) Int. Cl.
*G06Q 40/03* (2023.01)
*G06Q 20/38* (2012.01)
*G06Q 40/12* (2023.01)

(52) U.S. Cl.
CPC ........... *G06Q 40/03* (2023.01); *G06Q 20/389* (2013.01)

(58) Field of Classification Search
None
See application file for complete search history.

(56) References Cited

U.S. PATENT DOCUMENTS 7,716,619 B2    5/2010   Braceras et al.
9,855,785 B1    1/2018   Nagelberg et al.
(Continued)

FOREIGN PATENT DOCUMENTS

WO    WO-2025019042 A1 *   1/2025   ............. G06Q 10/02

OTHER PUBLICATIONS

J.M. Moringiello, C.K. Odinet. "Blockchain real estate and NFTs". William and Mary Law Review, vol. 64, p. 1131 (2022). ISSN: 0043-5589 , 2374-8524 (Year: 2022).*
(Continued)

*Primary Examiner* — Ayal I. Sharon
(74) *Attorney, Agent, or Firm* — Reston Law Group, LLP; Ralph P. Albrecht

(57) ABSTRACT

A method, system, computer program product of processing early payment financing request, enabling dynamic discounting (DD) or reverse factoring (RF) financing, via SmartHub Finance Processor (SHFP), including receiving request for Early Payment Financing Request (EPFR) from supplier; accessing asset SmartPass Non-FungibleToken (NFT) Repository; receiving risk management model; notarizing NFT ProxyPackage (NFTPP) to local NFTBlockchain Repository (NFTBCR); notarizing/collateralizing NFTPP to restricted access public NFTBCR; securely binding DynamicDiscounting (DD) NFT Cryptographic Token embodying DD Rights (DDRightsNFT), establishing Secure Unbreakable DigitalLinkage; notify EarlyPaymentNetwork (EPN), may notify FintechFinanceMarket; ValueChainFinanceExchange; DeFiMarket; or buyer; verify NFT to local NFTBCR; or respond to EPFR. Borrower requests funds presenting SmartPassDigitalCollateral, supplychainDigitalTrackTraceArtifact; Financer/Lender verify collateral process, provide bids for acceptance with a DigitalFundsTransferAgreement; register financers/lenders, provide
(Continued)

100 secured access, verify DigitalCollateralBlockchainTransactions, secure collateral, ensure authenticity by Digital Signatures/Blockchain, process loan agreements, transfer electronic/cryptocurrency funds financer-to-borrower, assess fees/interest, process payments, Forward/ReverseFactoring (RF) or DD loan terms, DDRightsNFT, participate in DD making independent early payment arrangements with supplier not involving buyer.

17 Claims, 7 Drawing Sheets

(56) References Cited

U.S. PATENT DOCUMENTS

| 10,505,726 B1 | 12/2019 | Andon et al. | |
| 10,540,654 B1 | 1/2020 | James et al. | |
| 10,614,661 B2 | 4/2020 | Doney et al. | |
| 10,789,239 B2 | 9/2020 | Ventura et al. | |
| 10,951,409 B2 | 3/2021 | Konda et al. | |
| 10,972,274 B2 | 4/2021 | Redpath et al. | |
| 10,991,185 B1 | 4/2021 | Luthra et al. | |
| 11,038,718 B2 | 6/2021 | Simons | |
| 11,048,788 B2 | 6/2021 | Witchey et al. | |
| 11,070,564 B2 | 7/2021 | McIver et al. | |
| 11,138,580 B1 | 10/2021 | Koch | |
| 11,170,092 B1 | 11/2021 | Liang | |
| 11,171,782 B2 | 11/2021 | Tang et al. | |
| 11,200,569 B1 | 12/2021 | James et al. | |
| 2004/0221162 A1 | 11/2004 | Kongtcheu | |
| 2009/0077386 A1 | 3/2009 | Simonian | |
| 2016/0283920 A1 | 9/2016 | Fisher et al. | |
| 2017/0046664 A1 | 2/2017 | Haldenby et al. | |
| 2019/0130416 A1 | 5/2019 | Boudville et al. | |
| 2019/0279197 A1 | 9/2019 | Wright et al. | |
| 2020/0204553 A1* | 6/2020 | Morales-Charlier | ... H04L 63/10 |
| 2020/0280444 A1 | 9/2020 | Tang et al. | |
| 2020/0294128 A1 | 9/2020 | Cella | |
| 2022/0058633 A1 | 2/2022 | Yantis et al. | |
| 2022/0067825 A1* | 3/2022 | Shapiro | G06Q 40/12 |
| 2022/0253868 A1 | 8/2022 | Scarseli | |
| 2025/0165966 A1* | 5/2025 | Eutsler | G06Q 40/03 |

OTHER PUBLICATIONS

Wisnu Uriawan. "Trustworthiness for personal lending on Blockchain". Master's Thesis. INSA de Lyon. (2022). English. NNT : 2022ISAL0105. https://theses.hal.science/tel-04146793/ (Year: 2022).*
L. Wang. "Confidential Distributed Ledgers for Online Syndicated Lending". Master's Thesis. University of Guelph. (Aug. 2022). https://atrium.lib.uoguelph.ca (Year: 2022).*
Imene Faci, M. Charifi. "The Role of Fintech in Promoting Financial Inclusion". Master's Thesis. Ecole Supérieure de Gestion et d'Economie Numérique (ESGEN). Koléa, Algérie. Jun. 20, 2023. http://dspace.esgen.edu.dz:8080/jspui/handle/123456789/185 (Year: 2023).*
S. Al-Mohamad, A.R. Khaki, M. Sraieb. "Cryptocurrency and real estate transactions". In the book "Blockchain in Real Estate", Editors: Ammar Jreisat and Mehdi Mili. pp. 103-122. 2024. SpringerNature. https://doi.org/10.1007/978-981-99-8533-3_6 (Year: 2024).*
H. Halaburda, N. Levina. "Digitization of Transaction Terms within TCE: Strong Smart Contract as a New Mode of Transaction Governance". MIS Quarterly. Vol. 48, No. 2, pp. 825-846. Jun. 2024. https://search.ebscohost.com (Year: 2024).*
ISR & WO from PCT/US 24/ 19448 with four references.

* cited by examiner

300

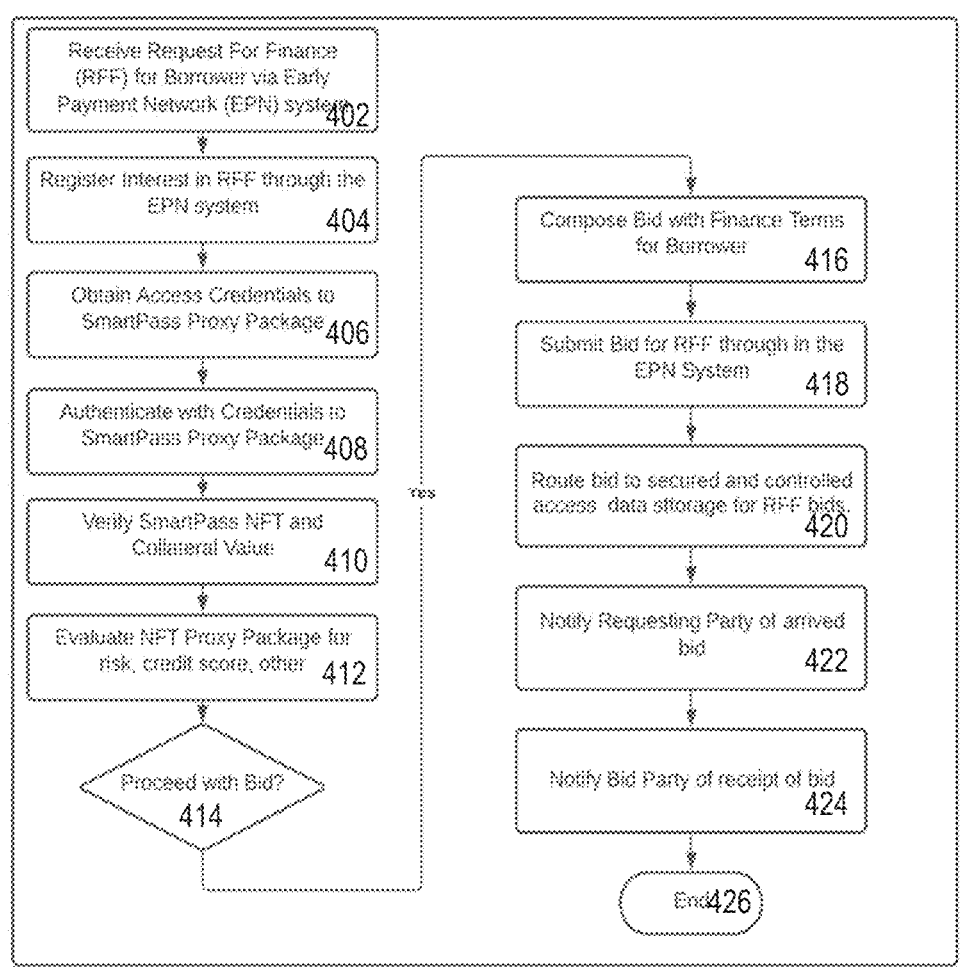

400

Receive Request For Finance (RFF) for Borrower via Early Payment Network (EPN) system 402

Register Interest in RFF through the EPN system 404

Obtain Access Credentials to SmartPass Proxy Package 406

Authenticate with Credentials to SmartPass Proxy Package 408

Verify SmartPass NFT and Collateral Value 410

Evaluate NFT Proxy Package for risk, credit score, other 412

Proceed with Bid? 414

Compose Bid with Finance Terms for Borrower 416

Submit Bid for RFF through in the EPN System 418

Route bid to secured and controlled access data storage for RFF bids. 420

Notify Requesting Party of arrived bid 422

Notify Bid Party of receipt of bid 424

End 426

FIG. 4

METHOD, SYSTEM AND COMPUTER PROGRAM PRODUCT FOR REQUESTING FINANCE FROM MULTIPLE EXCHANGE AND DIGITAL FINANCE SYSTEMS

BACKGROUND OF THE DISCLOSURE

Field of the Disclosure

The invention relates generally to supply chain and more particularly to supply chain management systems.

Related References

A majority of companies using conventional supply chain financing include suppliers and manufacturers that are small and medium-sized enterprises (SMEs). Many of these SMEs may not have access to capital or sufficient cash flow to fulfill unforeseen, large volume opportunities from their buyers. The supplier expenses are labor, material costs, overhead, and so on to fulfill orders. Supply chain finance arises from the need to finance their productions to meet the opportunities. Over 20% of businesses use some form of supply chain financing annually to meet these situations as they arise.

SUMMARY OF THE INVENTION

Reverse factoring is the finance arrangement where a 3rd party finance Party, such as a bank, pays the supplier's invoice, eventually collects from the buyer who pays the invoice, and coordinates exchanges and fees between the supplier and buyer parties, according to an example embodiment. Reverse factoring comes with risks, most notably when the buyer defaults on payment of the invoice even after goods have been delivered, according to an example embodiment. Many reasons for this can occur including reduced change in demand, poor financial management, or fraud, according to an example embodiment. A recourse agreement is one in which the finance party does not assume the risks involved, according to an example embodiment. A non-recourse agreement is when the finance party assumes the risk, according to an example embodiment. A general process is described as follows, according to an example embodiment.

1) Buyer, supplier, and financer enter into a reverse factoring agreement, according to an example embodiment.
2) The supplier sends an invoice to the buyer in advance for the order, according to an example embodiment.
3) After the buyer approves the order, the buyer informs the financer of the buyer's commitment, according to an example embodiment.
4) The financer provides the funds, usually about 80-90%, to the supplier, according to an example embodiment.
5) The supplier uses the funds to produce and ship the product, according to an example embodiment.
6) The supplier delivers the order to the buyer, and the buyer approves to delivery, according to an example embodiment.
7) The financer is informed of the delivery approval and releases the remaining 10-20% less any financing fees, according to an example embodiment.
8) On the invoice due date, the financer receives the payment from the buyer, according to an example embodiment.

Dynamic Discounting is a financial arrangement between a buyer and supplier for an early payment to the seller with several incentivized conditions that the supplier will discount the invoice by a certain amount, according to an example embodiment. The arrangement enables the supplier to choose when they want to receive payment in exchange for a reduced price on the goods and/or services the buyer has purchased, according to an example embodiment. Another effect of the arrangement is that this reduces the Costs of Goods Sold (COGS) and thereby increases the profitability for the buyer, according to an example embodiment. The dynamic component refers to the option to vary the discount based on the timing of payments to the supplier, according to an example embodiment. The sooner the early payment is committed, the larger the expected discount, according to an example embodiment. Dynamic discounting is typically on an invoice-by-invoice basis and is expressed as a percentage of the face value of the invoice, according to an example embodiment. The process for dynamic discounting is typically an extension to reverse factoring that reduces the financer's role to exchange and auditing rather than providing the funds, according to an example embodiment. Some examples of such finance exchanges include, e.g., but not limited to, Kyriba, PrimeRevenue, and Marco-Polo, etc., according to an example embodiment. For this flow, the financer described earlier is replaced with a finance exchange or a financial exchange, according to an example embodiment.

1) Supplier sends an invoice to the Buyer and financial exchange, according to an example embodiment.
2) Buyer approves the invoice, computes discount timetable for negotiations, and
publishes this on the financial exchange to the supplier, according to an example embodiment.
3) Supplier elects for the discounted early payment for the invoice and commits that decision on the financial exchange, according to an example embodiment.
4) The financial exchange produces a digital agreement with the terms between buyer and supplier along with the fees for the exchange, according to an example embodiment.
5) Buyer pays Supplier in full or partial 80-90% amount of the adjusted discounted invoice through the financial exchange, according to an example embodiment.
6) The financial exchange collects the exchange fee from the payment, according to an example embodiment.
7) The financial exchange performs the financial transactions from the Buyer bank account to Supplier bank account over a standard funds transfer network, e.g. SWIFT, according to an example embodiment.
8) If an early payment agreement was not committed, then payment is received at the invoice maturity date, according to an example embodiment.

Decentralized Finance (DeFi), is a collection of financial services on public blockchains, primarily Ethereum, with DeFi companies offering those financial services, according to an example embodiment. With DeFi, account holders can do many things banks support-earn interest, borrow, lend, buy insurance, trade derivatives, trade assets, according to an example embodiment. The difference between traditional banking and DeFi, is that DeFi operates faster and does not involve paperwork or a third party, according to an example embodiment. As with cryptocurrency (crypto), DeFi is global, disintermediated, and peer-to-peer, that is, directly between two people, not routed through a centralized system, according to one example embodiment, according to an example embodiment.

One of the benefits of DeFi is that of obtaining a loan instantly without filling out or completing paperwork, according to an example embodiment. However, similar to traditional banking, DeFi short and long-term loans typically require collateral, according to an example embodiment. In most cases, cryptocurrency is the collateral and collateralized non-fungible tokens (NFTs) are emerging, according to an example embodiment.

According to an example embodiment, a system, method and/or computer program product may be set forth including an example computer implemented method of processing at least one early payment financing request, enabling at least or more of at least one dynamic discounting (DD) or at least one reverse factoring (RF) financing, via at least one SmartHub finance processor (SHFP) may include at least one electronic computer processor coupled to at least one electronic memory storage device and coupled via at least one communications interface to at least one data communications network, the method may include: electronically receiving, by the at least one electronic computer processor of the at least one SHFP, at least one electronic request for the at least one early payment financing request from a supplier party device over the at least one data communications network; electronically processing, by the at least one electronic computer processor of the at least one SHFP, the at least one electronic request by performing a plurality of processing instructions may include at least one or more of: accessing, by the at least one electronic computer processor of the at least one SHFP, at least one asset, SmartPass non-fungible token (NFT) repository; receiving, by the at least one electronic computer processor of the at least one SHFP, at least one risk management model; notarizing, by the at least one electronic computer processor of the at least one SHFP, at least one NFT proxy package to at least one local NFT blockchain repository; notarizing and collateralizing, by the at least one electronic computer processor of the at least one SHFP, at least one NFT proxy package to at least one restricted access public NFT blockchain repository; securely binding at least one Dynamic Discounting (DD) NFT to the SmartPass NFT, a cryptographic token embodying rights associated with dynamic discounting, establishing a secure and unbreakable digital linkage; notifying, by the at least one electronic computer processor of the at least one SHFP, at least one or more of: at least one early payment network, wherein the at least one early payment network may in turn proceed to notify at least one or more of: at least one fintech finance market device; at least one value chain finance exchange device; at least one DeFi Market device; or at least one buyer party device; verifying, by the at least one electronic computer processor of the at least one SHFP, the NFT to the at least one local NFT blockchain repository; or responding, by the at least one electronic computer processor of the at least one SHFP, to the at least one early payment financing request to the supplier party device, according to an example embodiment.

According to another example embodiment, an example system of processing at least one early payment financing request, enabling at least or more of at least one dynamic discounting (DD) or at least one reverse factoring (RF) financing, the system may include: at least one SmartHub finance processor (SHFP) may include: at least one electronic computer processor; at least one electronic memory storage device coupled to said at least one electronic computer processor; and at least one communications interface coupled to said at least one electronic computer processor and coupled to at least one data communications network, wherein said at least one electronic computer processor of said at least one SHFP is configured to: electronically receive at least one electronic request for the at least one early payment financing request from a supplier party device over the at least one data communications network; electronically process the at least one electronic request by being configured to perform a plurality of processing instructions comprising wherein the at least one electronic computer processor is configured to at least one or more of: access at least one asset, SmartPass non-fungible token (NFT) repository; receive at least one risk management model; notarize at least one NFT proxy package to at least one local NFT blockchain repository; notarize and collateralize at least one NFT proxy package to at least one restricted access public NFT blockchain repository; securely bind at least one Dynamic Discounting (DD) NFT to the SmartPass NFT, a cryptographic token embodying rights associated with dynamic discounting, to establish a secure and unbreakable digital linkage; notify at least one or more of: at least one early payment network, wherein the at least one early payment network may in turn be configured to proceed to notify at least one or more of: at least one fintech finance market device; at least one value chain finance exchange device; at least one DeFi Market device; or at least one buyer party device; verify the NFT to the at least one local NFT blockchain repository; or respond to the at least one early payment financing request to the supplier party device, according to an example embodiment.

According to yet another example embodiment, a non-transitory, computer program product, embodied on at least one computer accessible medium, comprising at least one computer program instruction, which when executed on at least one electronic computer processor, performs a method of processing at least one early payment financing request, enabling at least or more of at least one dynamic discounting (DD) or at least one reverse factoring (RF) financing, via at least one SmartHub finance processor (SHFP) comprising at least one electronic computer processor coupled to at least one electronic memory storage device and coupled via at least one communications interface to at least one data communications network, the computer program product comprising the method may include: electronically receiving, by the at least one electronic computer processor of the at least one SHFP, at least one electronic request for the at least one early payment financing request from a supplier party device over the at least one data communications network; electronically processing, by the at least one electronic computer processor of the at least one SHFP, the at least one electronic request by performing a plurality of processing instructions may include at least one or more of: accessing, by the at least one electronic computer processor of the at least one SHFP, at least one asset, SmartPass non-fungible token (NFT) repository; receiving, by the at least one electronic computer processor of the at least one SHFP, at least one risk management model; notarizing, by the at least one electronic computer processor of the at least one SHFP, at least one NFT proxy package to at least one local NFT blockchain repository; notarizing and collateralizing, by the at least one electronic computer processor of the at least one SHFP, at least one NFT proxy package to at least one restricted access public NFT blockchain repository; securely binding at least one Dynamic Discounting (DD) NFT to the SmartPass NFT, a cryptographic token embodying rights associated with dynamic discounting, establishing a secure and unbreakable digital linkage; notifying, by the at least one electronic computer processor of the at least one SHFP, at least one or more of: at least one early payment network, wherein the at least one early payment network may in turn proceed to notify at least one or more of: at least one fintech finance market device; at least one value chain finance exchange device; at least one DeFi Market device; or at least one buyer party device; verifying, by the at least one electronic computer processor of the at least one SHFP, the NFT to the at least one local NFT blockchain repository; or responding, by the at least one electronic computer processor of the at least one SHFP, to the at least one early payment financing request to the supplier party device, according to an example embodiment.

According to still another example embodiment, computer implemented method for a party in the role of a borrower of funds to request funds by presenting digital collateral in the form of the SmartPass, a supply chain digital track and trace artifact, and for other Parties, in the role of a financer and a lender, to verify the collateral to process the request and provide bids to the borrower for their bid acceptance by the borrower with a digital agreement for funds transfer, the method may include: registering the financer and the lender; providing secured access to borrower opportunities; verifying digital collateral using at least one blockchain transaction; securing the digital collateral; and ensuring the digital collateral is authentic through at least one or more of: at least one digital signature; or blockchain storage, according to an example embodiment.

According to one example embodiment, the method may further include: processing agreements for funds between the financer and the borrower; transferring electronic and cryptocurrency funds from the financer to the borrower; assessing fees and interest; and processing payments from the borrowers for loan agreements, according to an example embodiment.

According to one example embodiment, the method may further include: providing several types of agreements with terms that the borrower may electronically select a choice to accept that involve financial mechanisms may include at least one or more of: forward and reverse factoring (RF); dynamic discounting (DD); and loan terms, according to an example embodiment.

According to one example embodiment, the method may further include: providing a dynamic discounting (DD) rights non-fungible token (NFT) a cryptographic token that is securely bound to a corresponding SmartPass NFT forming an unbreakable digital linkage, that may include: enabling acquiring or trading of rights to participate in dynamic discounting; and enabling making independent early payment arrangement with a supplier party that do not directly involve a buyer party, according to an example embodiment.

According to one example embodiment, a system, method or computer program product which may execute instructions to perform a method may include, according to one embodiment where processing at least one early payment financing request, enabling at least or more of at least one dynamic discounting (DD) or at least one reverse factoring (RF) financing, via at least one SmartHub finance processor (SHFP) comprising at least one electronic computer processor coupled to at least one electronic memory storage device and coupled via at least one communications interface to at least one data communications network, the method comprising: electronically receiving, by the at least one electronic computer processor of the at least one SHFP, at least one electronic request for the at least one early payment financing request from a supplier party device over the at least one data communications network; and electronically processing, by the at least one electronic computer processor of the at least one SHFP, the at least one electronic request by performing a plurality of processing instructions comprising at least one or more of: electronically accessing, by the at least one electronic computer processor of the at least one SHFP, at least one asset, SmartPass non-fungible token (NFT) repository; electronically receiving, by the at least one electronic computer processor of the at least one SHFP, at least one risk management model; electronically notarizing, by the at least one electronic computer processor of the at least one SHFP, at least one NFT proxy package to at least one local NFT blockchain repository; electronically notarizing and electronically collateralizing, by the at least one electronic computer processor of the at least one SHFP, at least one NFT proxy package to at least one restricted access public NFT blockchain repository; electronically binding the Dynamic Discounting (DD) NFT to the SmartPass NFT, ensuring a secure and unbreakable digital linkage; electronically notifying, by the at least one electronic computer processor of the at least one SHFP, at least one payment network; electronically verifying, by the at least one electronic computer processor of the at least one SHFP, the NFT to the at least one local NFT blockchain repository; or electronically responding, by the at least one electronic computer processor of the at least one SHFP, to the at least one early payment financing request to the supplier party device.

The method according to one embodiment may include where the electronically notifying, by the at least one electronic computer processor of the at least one SHFP, of the at least one early payment network, comprises: wherein the at least one early payment network in turn proceeds to notify at least one or more of: at least one fintech finance market device; at least one value chain finance exchange device; at least one DeFi Market device; or at least one buyer party device.

The method according to one embodiment may include where the electronically processing, by the at least one electronic computer processor of the at least one SHFP, the at least one electronic request by the performing said plurality of processing instructions comprises: electronically accessing, by the at least one electronic computer processor of the at least one SHFP, at least one asset, SmartPass non-fungible token (NFT) repository; electronically receiving, by the at least one electronic computer processor of the at least one SHFP, at least one risk management model; electronically notarizing, by the at least one electronic computer processor of the at least one SHFP, at least one NFT proxy package to at least one local NFT blockchain repository; electronically notarizing and electronically collateralizing, by the at least one electronic computer processor of the at least one SHFP, at least one NFT proxy package to at least one restricted access public NFT blockchain repository; electronically binding the Dynamic Discounting (DD) NFT to the SmartPass NFT, ensuring a secure and unbreakable digital linkage; electronically notifying, by the at least one electronic computer processor of the at least one SHFP, at least one or more of: at least one early payment network, wherein the at least one early payment network in turn proceeds to notify: at least one fintech finance market device; at least one value chain finance exchange device; at least one DeFi Market device; and at least one buyer party device; electronically verifying, by the at least one electronic computer processor of the at least one SHFP, the NFT to the at least one local NFT blockchain repository; and electronically responding, by the at least one electronic computer processor of the at least one SHFP, to the at least one early payment financing request to the supplier party device. The method according to one embodiment may include where a party in the role of a borrower of funds may request funds by presenting digital collateral in the form of a SmartPass, a supply chain digital track and trace artifact, and for other Parties, in the role of a financer or a lender, to verify the digital collateral to process the request of funds and provide bids to the borrower for bid acceptance by the borrower with a digital agreement for funds transfer, the method comprising: electronically registering the financer and the lender; electronically providing secured access to borrower opportunities; electronically verifying digital collateral using at least one blockchain transaction; electronically securing the digital collateral; and electronically ensuring the digital collateral is authentic through at least one or more of: electronically authenticating at least one digital signature; or electronically authenticating by using blockchain storage. The method according to one embodiment may further include where electronically processing agreements for funds between the financer and the borrower; electronically transferring electronic and cryptocurrency funds from the financer to the borrower; electronically assessing fees and interest; and electronically processing payments from the borrowers for loan agreements.

The method according to one embodiment may include where electronically providing several types of agreements with terms that the borrower may electronically select a choice to accept that involve financial mechanisms comprising at least one or more of: forward and reverse factoring (RF); dynamic discounting (DD); or loan terms.

The method according to one embodiment may further include where electronically providing a dynamic discounting (DD) rights non-fungible token (NFT), comprising: electronically enabling acquiring or trading of rights to participate in dynamic discounting; and electronically enabling making independent early payment arrangement with a supplier party that do not directly involve a buyer party.

The method according to one embodiment may include: where a party in the role of a borrower of funds to request of funds by presenting digital collateral in the form of a SmartPass, a supply chain digital track and trace artifact, and for other Parties, in the role of a financer or a lender, to verify the digital collateral to process the request of funds and provide bids to the borrower for bid acceptance by the borrower with a digital agreement for funds transfer, the method further comprises: electronically registering the financer and the lender; electronically providing secured access to borrower opportunities; electronically verifying digital collateral using at least one blockchain transaction; electronically securing the digital collateral; and electronically ensuring the digital collateral is authentic through at least one or more of: electronically authenticating at least one digital signature; or electronically authenticating by using blockchain storage.

The method according to one embodiment may further include: further electronically processing agreements for funds between the financer and the borrower; electronically transferring electronic and cryptocurrency funds from the financer to the borrower; electronically assessing fees and interest; and electronically processing payments from the borrowers for loan agreements.

The method according to one embodiment may further include: further electronically providing several types of agreements with terms that the borrower may electronically select a choice to accept that involve financial mechanisms comprising at least one or more of: forward and reverse factoring (RF); dynamic discounting (DD); or loan terms.

The method according to one embodiment may further include: further electronically providing a dynamic discounting (DD) rights non-fungible token (NFT), comprising: electronically enabling acquiring or trading of rights to participate in dynamic discounting; and electronically enabling making independent early payment arrangement with a supplier party that do not directly involve a buyer party.

In this disclosure, according to an example embodiment, an example method is described for a Party in the role of a borrower for funds to request for funds by presenting digital collateral in the form of a SmartPass and for other Parties, in the role of financer and lender, to verify the SmartPass collateral, to process the request, and provide bids to the borrower for their bid acceptance by the Borrower Party with a digital agreement for funds transfer, according to an example embodiment.

BRIEF DESCRIPTION OF THE VARIOUS EXAMPLE VIEWS OF THE DRAWINGS

This present disclosure will be fully understood with reference to the following detailed description when taken in conjunction with the figures, herein:

FIG. 4 is an illustrative flowchart showing a bid response process, according to an example embodiment;

Figure 6:
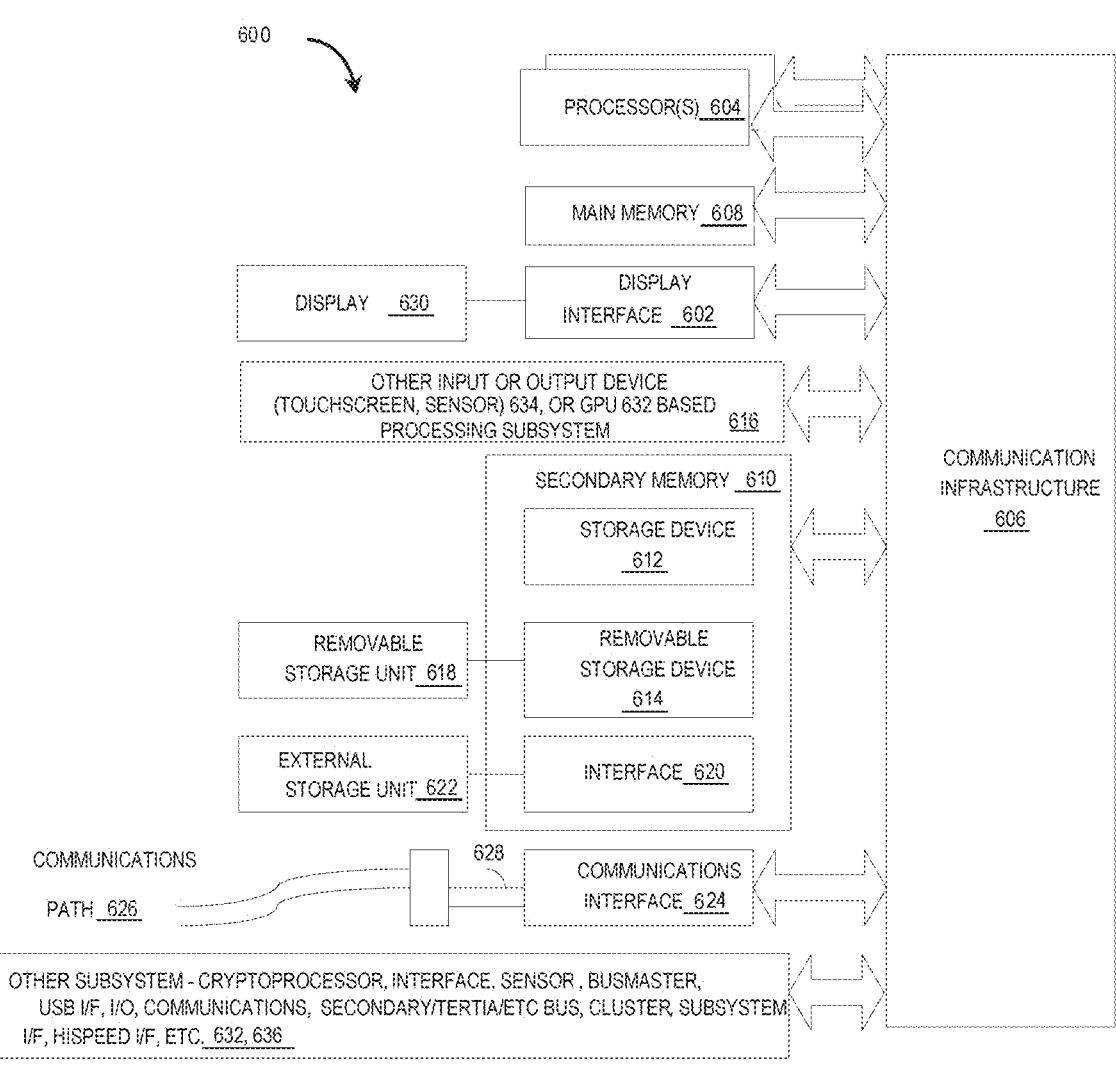
Figure 7:
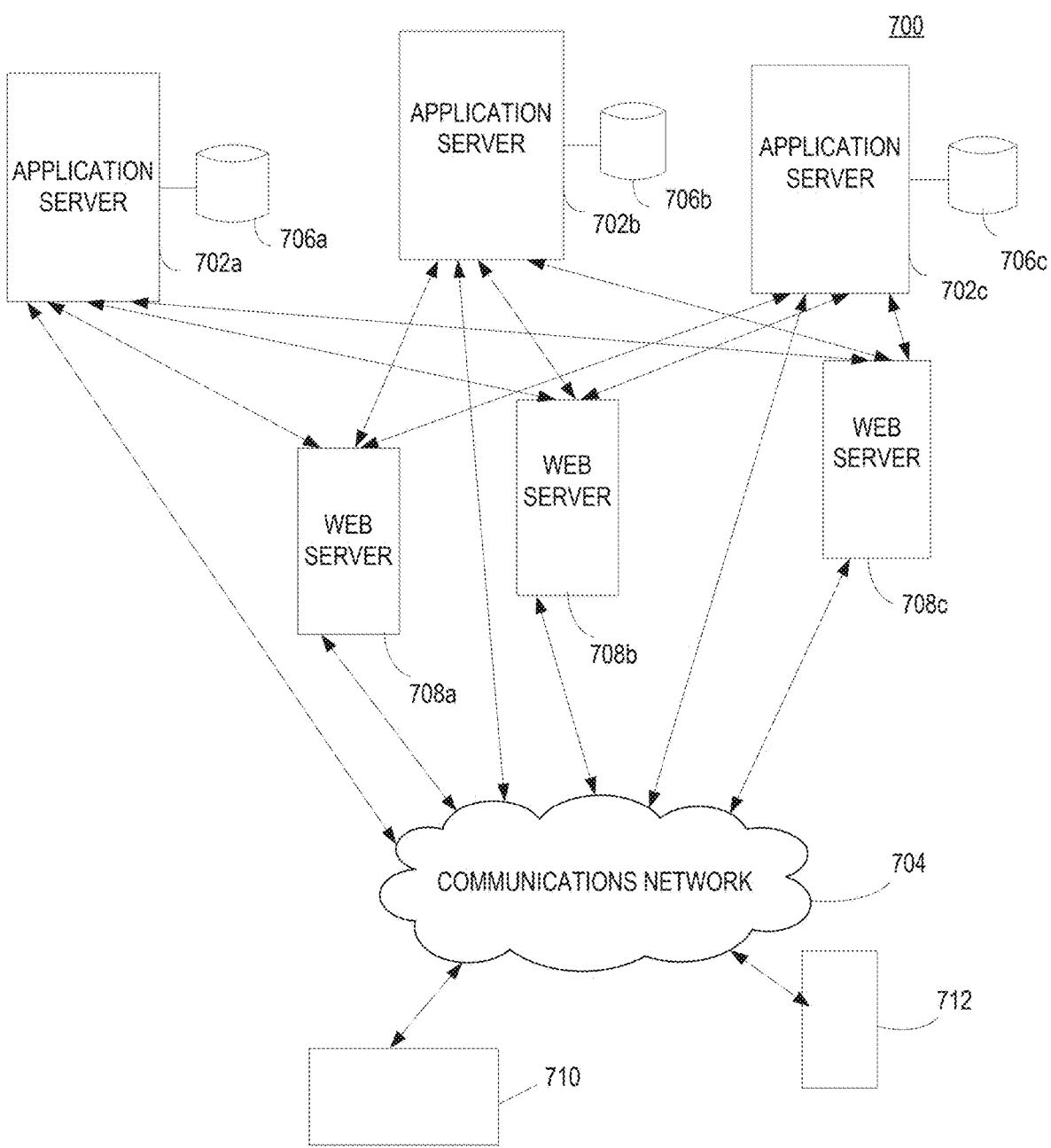

FIG. 6 depicts an example embodiment of an example component level example hardware architecture for an example computing device as may be used for any of various example hardware subsystem components of an example system, according to one example embodiment; and FIG. 7 depicts an example embodiment illustrating an example system level hardware architecture for an example application server, web server embodiment of an example service provider system for providing an example software architecture of various example subsystem components of an example networking system, which may be used to implement, according to one example embodiment.

DETAILED DESCRIPTION OF EXAMPLE EMBODIMENTS OF THE INVENTION

The various embodiments of the invention described herein should not be limited to the description, even with reference to the accompanying figures and drawings depicted, but only with respect to the claims. The invention may be embodied in different forms and should not be restricted as set forth here.

The various embodiments of the invention described herein should not be limited to the description, even with the reference to the accompanying figures and drawings depicted herein, according to an example embodiment. The invention may be embodied in different forms and should not be restricted at set forth, according to an example embodiment. The following provides a logical view of the system, according to an example embodiment.

Figure 1:
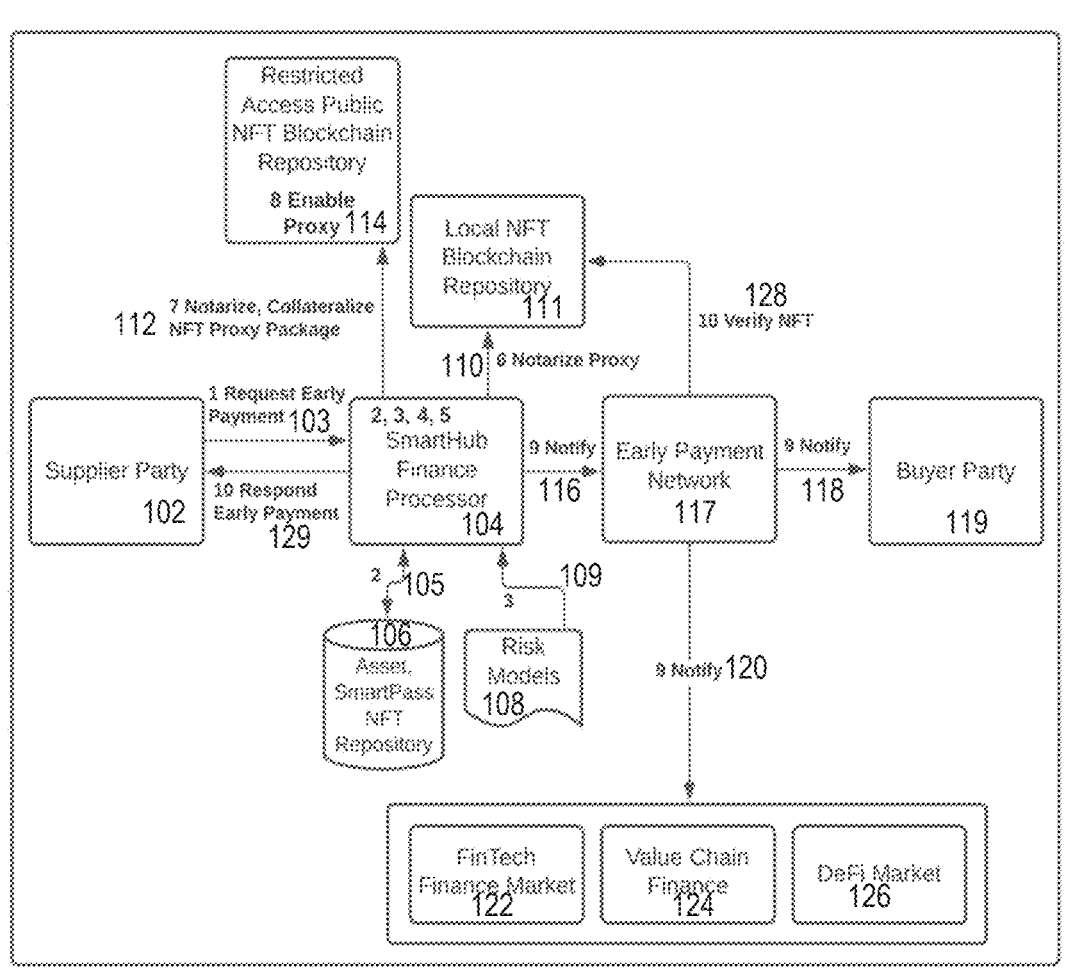
FIG. 1 is a schematic view showing components utilized in the invention, according to an example embodiment.

FIG. 1 is a schematic view 100 showing components utilized in the invention, according to an example embodiment, see further details below.

Figure 2:
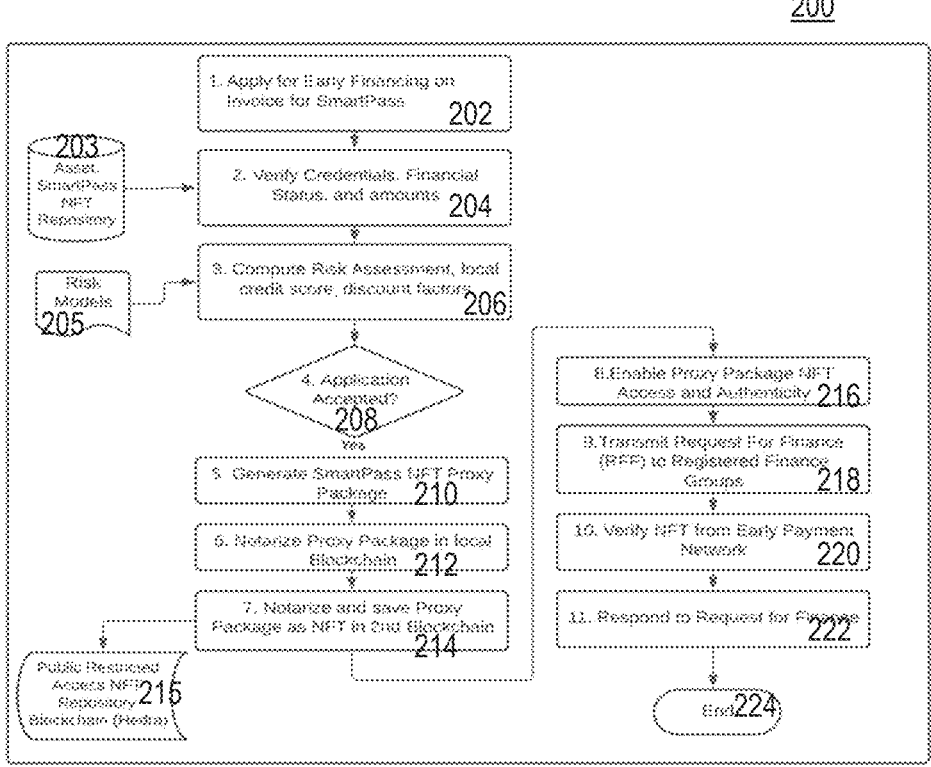
FIG. 2 is a flowchart showing flow for a request for early payment, according to an example embodiment.

FIG. 2 is a flowchart 200 showing flow for a request for early payment, according to an example embodiment, see further details below.

Figure 3:
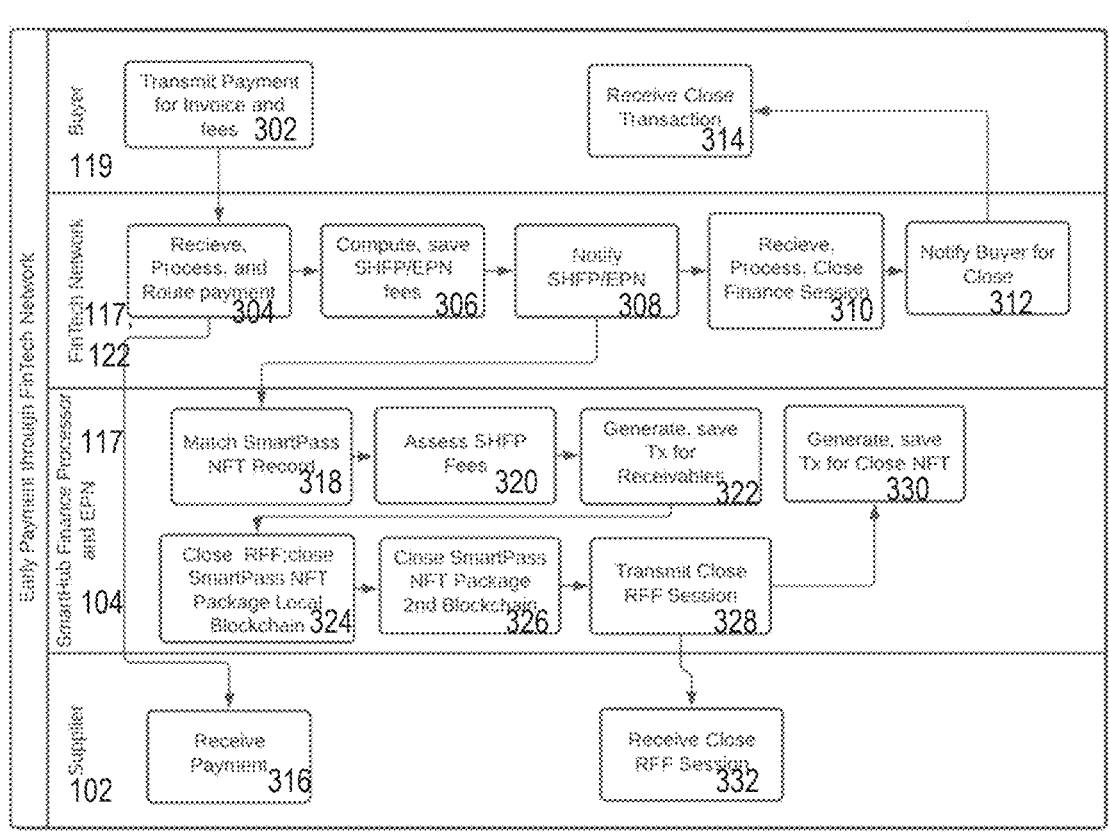
FIG. 3 is an example multi-lane pool process diagram showing an Early Payment option 1 from Table 1, according to an example embodiment.

FIG. 3 is an example multi-lane pool process diagram 300 showing an Early Payment option 1 from Table 1, according to an example embodiment, see further details below.

FIG. 4 is an illustrative flowchart 400 showing a bid response process, according to an example embodiment, see further details below.

Figure 5:
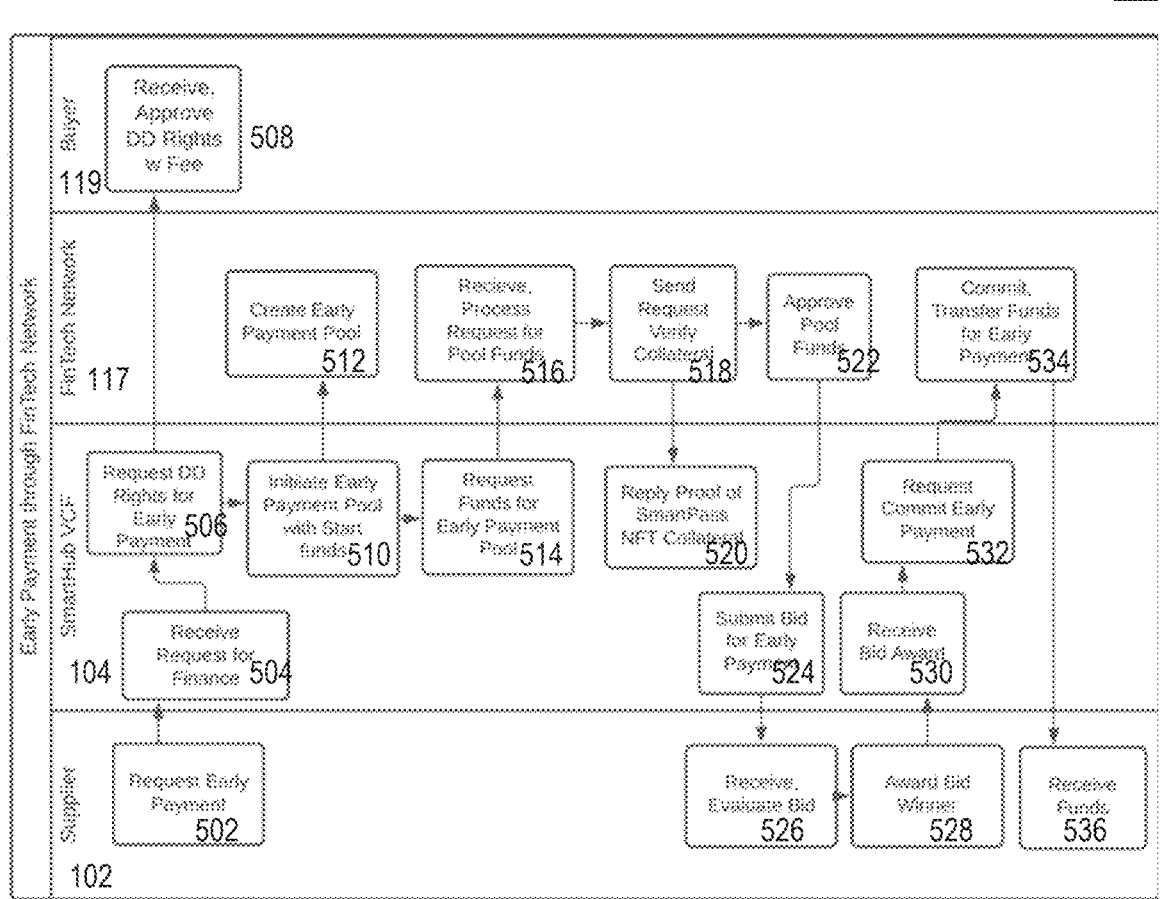
FIG. 5 is a multi-lane pool process diagram illustrating the finance option 7 in Table 1, according to an example embodiment.

FIG. 5 is a multi-lane pool process diagram 500 illustrating the finance option 7 in Table 1, according to an example embodiment, see further details below.

FIG. 6 depicts an example embodiment of an example component level example hardware architecture 600 for an example computing device as may be used for any of various example hardware subsystem components of an example system, according to one example embodiment, see further details below.

FIG. 7 depicts an example embodiment illustrating an example system level hardware architecture 700 for an example application server, web server embodiment of an example service provider system for providing an example software architecture of various example subsystem components of an example networking system, which may be used to implement, according to one example embodiment, see further details below.

Table 1 set forth below (the table appears after FIG. 5, below, before the more detailed description of FIG. 6) the table lists various example financing options, according to an example embodiment.

Financing options for relationships among supplier, buyer, and finance parties, identified as 'FinTech' and Value Chain Finance, 'VCF', are listed in Table 1, according to an example embodiment. FinTech is used to refer to online finance services engaged through Application Programming Interfaces (APIs) for both traditional digital banking and decentralized finance services, according to an example embodiment. Use of the FinTech term for this discussion is not specific to one finance service provider or institution, according to an example embodiment. VCF is Value Chain Finance that is a specific FinTech provider that is involved in the exclusive security for collateralizing the SmartPass NFT, and the borrowing and lending processes, according to an example embodiment. In this description, the VCF is a financing source of funds, according to an example embodiment.

Financing Options are provided in Table 1, below between the descriptions of FIGS. 5 and 6, according to an example embodiment.

The components involved with the method are provided in FIG. 1 and described as follows, according to an example embodiment.

Supplier Party: Producer for goods and services that are mutually agreed upon and purchased by a buyer party, according to an example embodiment.

Buyer Party: Purchaser for goods and services that are mutually agreed upon with a supplier party, according to an example embodiment.

SmartHub Finance Processor: Processes financial services for SmartHub users including smart contract processing for coordination for Early Payment requests, notarizing and collateralizing the SmartPass with the blockchain, computing risk assessments, and credit scores, notifying FinTech and other external financial services, hosting and competing finance bids for Supplier, and life cycle management for the SmartPass, according to an example embodiment.

Early Payment Network (EPN): Collection of membership of borrower, financer, and lender parties that enables them to conduct and participate in funding requests, funding bidding, and funding agreements, according to an example embodiment.

FinTech Finance Market: For this discussion, a general description for financial services that participate with supply chain financing, according to an example embodiment.

Value Chain Finance: A FinTech participant that provides SmartHub members with competitive financing through blockchain-enabled transaction traceability, endorsing, underwriting, and rating SmartPass NTFs, and participating in FinTech partnerships for an array of funding opportunities as itemized in Table 1, according to an example embodiment.

DeFi Market: Specialized part of FinTech that provides financing in a decentralized digital infrastructure offering a broader range of opportunities involving cryptocurrencies, fiat, rapid loans through crypto-based collateral, and lending pools with independent lending rules, fees, interest, and payment terms, according to an example embodiment.

Local NFT Blockchain Repository: Private SmartHub blockchain that notarizes and stores digital assets are NFTs related to supply chain track and trace and operations, according to an example embodiment.

Restricted Access Public NFT Blockchain Repository: A blockchain mirror of selected secured SmartHub NFTs that enables external Parties with proper credentialing to authenticate NFT holdings such as SmartPass NFTs, financer-seller agreements, and other blockchain transactions; validate SmartPass NFT collateral; and transaction history for auditing and analysis, according to an example embodiment.

Financing Options for Supply Chain Financing for Early Payments

Table 1 depicted below the description of FIG. 4, provides for nine options for providing funds in response to a request for financing (RFF), according to an example embodiment. Since the request is for early payment, seven of the options are related to dynamic discounting, as an additional source of revenue for financers and lenders beyond interest on a loan agreement and processing fees, according to an example embodiment. The revenue for VCF and other participants are identified in the far right column, "Revenue for VCF, Financer", according to an example embodiment.

Normally dynamic discounting benefits only the buyer since they are provided with the opportunity to provide the early payment with this arrangement, according to an example embodiment. In traditional banking arrangements, banks providing reverse factoring to the supplier do not extend their services to include dynamic discounting relationships, according to an example embodiment. This is a factor of traditional models and this being recent technology capabilities for FinTech information systems, according to an example embodiment. In the first Financing Option, "Buyer Early Payment", the buyer party provides the invoice funds to the supplier minus the discount, according to an example embodiment. The VCF revenue is listed as "Fee Percent of DD", according to an example embodiment. This fee is assigned for the use of the Early Payment Network (EPN) to conduct the early payment financial transactions, security, and processing blockchain notaries for the transactions such as agreements and digital signatures, according to an example embodiment. For this description, the VCF is the operator of the EPN and hence is collected as a percentage of the amount of the dynamic discount value, according to an example embodiment.

Request for Early Payment, Request for Financing

FIG. 1 sets forth a block diagram 100 including providing for an example sequence of interactions for the supplier party 102 to perform a request for early payment from an early payment network 117, according to an example embodiment. FIG. 1 identifies example activities by the example sequence numbers within a component block to indicate the example actions performed by the block, according to an example embodiment. For example, the SmartHub Finance Processor 104 may perform the activities or processes for 2, 3, 4, and 5 with interactions with other components for 2, 3, 6, 7, 9, and 10, according to an example embodiment.

Supplier party 102 may in 103 request early payment 1, from SmartHub finance processor 104, according to an example embodiment.

SmartHub finance processor 104 may in 105 communicate 2 with asset, SmartPass NFT repository 106, may in 109 communicate 3 with risk models 108, 4 and 5 are discussed elsewhere herein (performed by the SmartHub finance processor 104), may in 110 communicate 6 as notarize proxy with local NFT blockchain repository 111, and may in 112 communicate 7 as notarize, collateralize NFT proxy package with restricted access public NFT blockchain repository 114, according to an example embodiment.

Restricted access public NFT blockchain repository 114 may enable proxy 8, according to an example embodiment.

SmartHub finance processor 104 may in 116 communicate 9 notifying early payment network 117, according to an example embodiment.

Early Payment network 117 may in 120 communicate by notifying 9 at least one or more of fintech finance market 122, value chain finance 124, and DeFi Market 126, and in 118 may communicate 118 to the buyer party 119, and in 128 may communicate 10 to verify NFT with local NFT blockchain repository 111, according to an example embodiment.

SmartHub finance processor 104 may in 129 communicate 10 to supplier party 102, according to an example embodiment.

FIG. 2 depicts an example illustration of a flow diagram 200 of an example embodiment, including in 202 applying for early financing on an invoice for SmartPass in step 1, the Supplier Party may make a request for early payment through a web interface to the web service API in the SmartHub Finance Processor, and from 202, flow diagram 200 may continue with 204, according to an example embodiment.

In 204, verifying credentials, financial status and amounts, receiving from asset SmartPass NFT repository 203, in step 2, the SmartHub Finance Process verifies the Supplier Party's credentials, financial status, the monetary amount, and other applicable financial terms and conditions such as the duration, type of financing, and requested finance institutions, and from 204 flow diagram 200 may continue with 206, according to an example embodiment.

In 206, after the verification of 204 in step 2, risk assessment may be computed, local creditscore and applying discount factors in step 3, the SmartHub Finance Processor may compute a risk assessment (which may use risk models 205) and financing options, such as, e.g., but not limited to, discount factors, for the financing based on the Supplier Party's request, the Party's financial history recorded from prior financing within SmartHub including, e.g., but not limited to, a SmartHub local credit score based on that history, and other data based on the request and an external source that may include a business financial rating and history, and from 206 flow diagram 200 may continue with 208, according to an example embodiment.

In 208, it may be determined if the application is accepted and if so, then may continue with 210, or alternatively may if determined not to be accepted, e.g., continue with 202 to seek an amended application (not shown), after the application is accepted in Step 4, from 208 flow diagram 200 may continue with 210.

In 210, a SmartPass NFT proxy package may be generated, including, e.g., the SmartHub Finance Processor in step 5 generating the example SmartPass Non-Fungible Token (NFT) Proxy Package that may include creating or minting the NFT with the local NFT Blockchain Repository where the NFT may be stored after being created, according to an example embodiment. Also in step 5, the SmartHub Finance Processor may prepare the proxy Package with a data structure of meta-data that may describe the newly created NFT including the NFT's location link or Universal Resource Identifier (URI) for its storage location within the local NFT Blockchain Repository, data describing the request for financing opportunity, and performing, e.g., but not limited to, steps as are discussed further below with reference to and as set forth in FIG. 4, below, and from 210 flow diagram 200 may continue with 212, according to an example embodiment.

In 212, an example proxy package may be notarized in an example local blockchain, as shown in step 6, the SmartHub Finance Processor may request to the Local NFT Blockchain Repository that a proxy package be notarized in the local blockchain, and from 212 flow diagram 200 may continue with 214, according to an example embodiment.

In 214, according to one example embodiment, in the illustration 200 of FIG. 2, example step 7 may include notarizing and saving a proxy package as an NFT in a $2^{nd}$ Blockchain, and may include, as shown in 215, storing a public restricted access NFT repository Blockchain (Hedra), and from 214 flow diagram 200 may continue with 216, according to one example embodiment. From example step 7, the flow diagram may continue with 216 with step 8, according to an example embodiment.

In 216, as shown in step 8, according to an example embodiment, an example proxy package NFT access and authenticity may be enabled, and from step 8, the flow diagram 200 of FIG. 2 may continue with 218 in step 9, according to an example embodiment.

In 218 as shown in step 9, according to an example embodiment, the request for finance (RFF) may be transmitted as illustrated to registered finance groups, and from 218 of step 9, the flow diagram 200 of FIG. 2 may continue with 220 showing step 10, according to an example embodiment.

In 220 as illustrated in step 10, according to an example embodiment, the NFT may be verified from the early payment network, and from 220 showing step 10, the flow diagram 200 of FIG. 2 may continue with 222 as may include step 11, according to an example embodiment.

In 222 as shown in step 11, according to an example embodiment, the request for finance (RFF) may be responded to, and from 222 showing step 11, in one embodiment, the flow diagram 200 of FIG. 2 may proceed to 224 to immediately end, according to an example embodiment.

For handling the request, the SmartHub Finance Processor is central to orchestrating the activities identified and described in flow diagram 200 of FIG. 2 that results in a digital Request for Financing (RFF) to selected entities in the FinTech community, securing the SmartPass NFT as collateral in the private and public NFT Blockchain Repositories, and providing the digital mechanisms for responding to RFF through submitting bids or providing offers to the Supplier in the Early Payment Network, according to an example embodiment. FIG. 2 illustrates an example step-by-step process flow 200 for the Request for Early Payment as may be described in further detail with reference to FIG. 3 below, according to an example embodiment.

Buyer Response to Request for Finance

In FIG. 3, flow diagram 300 may illustrate, an example Early Payment option 1 from table 1 is depicted in a multi-lane pool process data flow diagram, according to an example embodiment. The four parties include supplier party 102, buyer party 119, the FinTech network 117, 122, and the combined SmartHub Finance Processor 104 with the EPN 117, according to an example embodiment. In response the RFF, the buyer party 119 may provide the early payment, transmitting payment for invoice and/or fees 302, FinTech Network may receive process, and route payment 304, may allow supplier 102 to receive payment 316, and may compute save, SHFP/EPN fees 306, notifying SHFP/EPN 308, may pass to match SmartPass NFT record 318, may receive, process, close finance session 310, notify buyer for close 312, and buyer may receive close transaction communication 314, according to an example embodiment. For this discussion, the buyer party 302 may perform the funds transfer by transactions through a FinTech Network 117, 122 that may be separate from SmartHub finance processor 104 and the EPN 117, according to an example embodiment. The FinTech network 117, 122 may use its infrastructure combined with a funds "wire" service such as, e.g., but not limited to, ACH, Swift, etc., to transfer the funds from the buyer party's 119 bank to the supplier party's 102 bank as indicated in FIG. 3 as "Receive Payment" 316, according to an example embodiment. Because of, e.g., but not limited to, the SmartHub relationship, the SmartPass track and trace services as illustrated in 300-332, and the RFF opportunities with the FinTech Network 117, 122, the FinTech Network may collaborate with the SmartHub Finance Processor (SHFP) 104 (see FIG. 1) and the EPN 117 for processing the buyer 119 to supplier 101 funds transaction, according to an example embodiment. This process may be illustrated with the process blocks receiving, processing and routing payment 304, "Compute, save SHFP/EPN fees" 306, notifying SHFP/EPN 308, where the SHFP/EPN may proceed with closing out the RFF solicitation session 324, by matching SmartPass NFT record 318, assessing SHFP fees 320, generating, saving the transaction (Tx) for receivables 322, closing RFF; closing SmartPass NFT package local blockchain 324, closing SmartPass NFT package second blockchain 326, closing the restricted public access for the SmartPass NFT 326, transmitting close RFF session 328, generating, saving Tx for closing NFT 330, and assigning new transaction entries 330 in the blockchain indicating that the SmartPass NFT Package and collateral is no longer effective, according to an example embodiment.

After the NFT blockchains are updated 328, 330, the Supplier 102, the originator for the request for early payment, may be notified of the RFF session 332, according to an example embodiment.

Bid Response to Request for Finance

After a financer or lender party receives an RFF from the Supplier 102 through the EPN 117, they can elect to participate in a response by registering interest in the RFF through a registration API in the EPN 117, according to an example embodiment. The bid response process flow 400 may be shown in FIG. 4, according to an example embodiment.

FIG. 4 including flow diagram 400 may include, e.g., but not limited to, and may begin with 402, according to an example embodiment.

In 402, flow diagram 400 may include receiving request for finance (RFF) for borrower via an early payment network (EPN) system, and from 402, flow diagram 400 may continue with 404, according to an example embodiment.

In 404, flow diagram 400 may include registering interest in the RFF through the EPN system 404, and from 404, flow diagram 400 may continue with 406, according to an example embodiment.

In 406, flow diagram 400 may include obtaining access credentials to SmartPass Proxy package, and from 406, flow diagram 400 may continue with 408, according to an example embodiment.

In 408, flow diagram 400 may include authenticating with access credentials to SmartPass Proxy package, and from 408, flow diagram 400 may continue with 410, according to an example embodiment.

In 410, flow diagram 400 may include verifying SmartPass NFT and collateral value, and from 410, flow diagram 400 may continue with 412, according to an example embodiment.

In 412, flow diagram 400 may include evaluating NFT proxy package for risk, credit score, and other, etc., and from 412, flow diagram 400 may continue with 414, according to an example embodiment.

In 414, flow diagram 400 may include determining whether to proceed with a bid, and if determined to proceed then continuing with 416, or if not then, flow diagram 400 may continue with 402, according to an example embodiment.

In 416, flow diagram 400 may include composing a bid with finance terms for the borrower, and from 416, flow diagram 400 may continue with 418, according to an example embodiment.

In 418, flow diagram 400 may include submitting a bid for RFF through in the EPN system, and from 418, flow diagram 400 may continue with 420, according to an example embodiment.

In 420, flow diagram 400 may include routing a bid to secured and controlled access data storage for RFF bids, and from 420, flow diagram 400 may continue with 422, according to an example embodiment.

In 422, flow diagram 400 may include notifying requesting party of arrived bid, and from 422, flow diagram 400 may continue with 424, according to an example embodiment.

In 424, flow diagram 400 may include notifying bid party of receipt of bid, and from 424, flow diagram 400 may continue with 426, and may immediately end, according to an example embodiment.

After their registration is received, their credentials may be verified and a response may be provided to the registered party that may include the credentials to access the SmartPass NFT in the Restricted Access Public NFT Blockchain Repository 114, according to an example embodiment. The party may authenticate with the NFT Blockchain Repository 111, according to an example embodiment. The party may verify 128 the SmartPass NFT and collateral value with the NFT Blockchain, according to an example embodiment. The party may retrieve the NFT Proxy package that may have been stored earlier for the Request for Early Payment 103 by the SmartHub Finance Processor 104, according to an example embodiment. The party may review the package to assist with the decision to respond with an offer for the RFF, according to an example embodiment. For the decision to respond, the party may compose a digital bid in a prescribed format for the RFF that may include, e.g., but not limited to, the funding offer, financial terms, and/or details, etc., on the funding transfer mechanisms and/or schedule, according to an example embodiment. The party may submit their bid securely through the EPN 117, according to an example embodiment. The EPN 117 may be responsible for securely routing and/or aggregating all bid submissions to a secured data storage assigned for the RFF, according to an example embodiment. The requesting party that initiated the RFF, for example, through a request for early payment, may be notified of the arriving bid, according to an example embodiment. The buyer party 119 that submitted the bid may receive a notification 118 of the successful receipt of the bid, according to an example embodiment.

Buyer Rights to Dynamic Discounting as NFT

Dynamic Discounting is typically a financial arrangement between buyer and supplier parties in which the buyer 119 may agree to pay the supplier's 102 invoice early or immediately with the incentive that the supplier discounts the invoice by some percentage, according to an example embodiment. Both parties benefit from this transaction in that the supplier 102 may obtain the funds they need faster and the buyer party 119 may reduce their costs of good sold (COGS) for increasing the profit margin, according to an example embodiment. For options 4, 5, and 6 in Table 1, the description may include a fee called "pays fee to Buyer for rights", according to an example embodiment. These may be the rights for exercising the Dynamic Discounting (DD), according to an example embodiment. In these finance option, these rights may be notarized as a DD NFT assigned to the buyer party 119, according to an example embodiment. The DD NFT provides the buyer party 119 with the opportunity for first right of refusal and to sell their DD NFT as their rights to enable a new owner to participate in the DD financial arrangement with the supplier party 102, according to an example embodiment. The DD NFT is cryptographically linked and tethered to the SmartPass NFT, ensuring an unbreakable digital linkage between the two tokens. These DD rights can be enforced by the issuance and access control of the SmartPass NFT, according to an example embodiment. The supplier party may not be under any obligations to accept a DD arrangement and may not be affected by the rights, according to an example embodiment.

In FIG. 5, the multi-lane pool process diagram 500 depicts an example data flow diagram between various example entities, and may illustrate the finance option 7 in Table 1, according to an example embodiment. In option 7, VCF 104 and FinTech 117 may pool their funds to provide early payment to the supplier party, according to an example embodiment. In FIG. 5, the SmartHub VCF 104 may perform the task of "Request DD Rights for Early Payment" 506, according to an example embodiment. After the buyer party 119 may arrive at an agreement for the DD Rights fees, after receiving, and approving the right with fee 508, and the terms of the transfer of rights, the DD Rights, represented by a blockchain non-fungible token (NFT), may be digitally and cryptographically transferred in ownership in the SmartHub Blockchain to VCF, according to an example embodiment. The payment for the fees to the buyer party 119 may be executed through, e.g., but not limited to, FinTech 117, crypto exchange, or other banking payment mechanisms, according to an example embodiment. Other arrangements could involve the buyer 119 negotiating to receive a portion of the discount as its compensation, according to an example embodiment. The transfer of ownership may be notarized within the SmartHub Blockchain and optionally notarized in the 2nd Blockchain system for the Public NFT Storage, according to an example embodiment. The VCF may proceed to collaborate with the FinTech Network to form a pooling arrangement for the funds, according to an example embodiment. The VCF pool may offer early payment to the supplier party 102 for an immediate funds transfer for a negotiated discount on the invoice amount, according to an example embodiment. The VCF may provide the bid to the supplier party, according to an example embodiment. In this scenario, the supplier party may award the bid, which in this case may include the VCF-FinTech pool, according to an example embodiment. After an agreement on the funds transfer network, e.g., cryptocurrency exchange, the VCF-FinTech pool authorizes electronic funds to be sent to the supplier party 102, according to an example embodiment.

These funds may fulfill the supplier party's 102 request for early payment 502 for their invoice, according to an example embodiment.

FIG. 5 may include data flow diagram 500, which may begin with the supplier 102 requesting early payment 502, and may continue with 504, according to an example embodiment.

In 504, SmartHub VCF 104 may receive a request for finance 504, and from 504, flow diagram 500 may continue with 506, according one example embodiment.

In 506, SmartHub VCF 104 may request DD rights for early payment 506, and from 506, flow diagram 500 may continue with 510 and 508, according one example embodiment.

In 508, buyer 119 may receive, approve, etc., DD rights with a fee 508, according one example embodiment.

In 510, SmartHub VCF 104 may initiate early payment pool with start funds 510, and from 510, flow diagram 500 may continue with 514 and 512, according one example embodiment.

In 512, FinTech network 117 may create an early payment pool 512, according one example embodiment.

In 514, SmartHub VCF 104 may request funds for early payment pool 514, and from 514, flow diagram 500 may continue with 516, according one example embodiment.

In 516, SmartHub VCF 104 may receive, process, and/or request for pool funds, and from 516, flow diagram 500 may continue with 518, according one example embodiment.

In 518, SmartHub VCF 104 may send a request, verify collateral, and from 518, flow diagram 500 may continue with 520, 522, according one example embodiment.

In 520, SmartHub VCF 104 may reply proof of SmartPass NFT collateral 520, according one example embodiment.

In 522, FinTech Network 117 may approve pool funds 522, flow diagram 500 may continue with 524, according one example embodiment.

In 524, SmartHub VCF 104 may submit bid for early payment 524, flow diagram 500 may continue with 526, according one example embodiment.

In 526, Supplier 102 may receive, evaluate a bid 526, flow diagram 500 may continue with 528, according one example embodiment.

In 528, Supplier 102 may award bid winner 528, flow diagram 500 may continue with 530, according one example embodiment.

In 530, SmartHub VCF 104 may receive bid award 530, and flow diagram 500 may continue with 532, according one example embodiment.

In 532, SmartHub VCF 104 may request commit early payment 532, and flow diagram 500 may continue with 534, according one example embodiment.

In 534, FinTech Network 117 may commit, transfer funds for early payment 534, and flow diagram 500 may continue with 536, according one example embodiment.

In 536, Supplier 102 may receive funds 536, and flow diagram 500 may immediately end, according one example embodiment.

Table 1 appears below.

output layer and action output layer devices, action event generators, after state processors, flow diagram execution processors, example state machine devices, flow diagram elements, state engines, event receiver devices, source devices, asset state devices, event queue devices, action queue devices, app asset state databases and/or services, FSM framework components, SmartHub devices, cryptocurrency exchange devices, as well as example computing devices of users, mobile devices, network communication

TABLE 1

| | Finance Model | Finance Type | Description | Revenue for VCF, Financer |
|---|---|---|---|---|
| 1 | Buyer Early Payment | Dynamic Discounting (DD) | Buyer with Early Payment in EPN system | Fee Percent of DD |
| 2 | Buyer-VCF Early Payment | DD | Buyer and VCF pool Early Payment in EPN system | Fee Percent of DD + Part of DD |
| 3 | Buyer-VCFFinTech Early Payment | DD | Buyer, VCF, FinTech pool Early Payment in EPN system | Fee Percent of DD + Part of DD |
| 4 | VCF Early Payment | Reverse Factoring (RF), DD | VCF Early Payment, collects from Buyer at Maturity, VCF pays fee to Buyer for rights; all Tx in EPN system | Fee Percent of DD + Full Percent of DD – fee to Buyer |
| 5 | VCF Early Payment with FinTech loans to VCF | RF, DD | VCF Early Payment, VCF borrows from FinTech, VCF pays fee to Buyer for rights | Fee Percent of DD + Part of DD – fee to Buyer – Interest on Loan |
| 6 | FinTech Early Payment | RF, DD | FinTech delivers early payment at DD; FinTech pays fee to Buyer for rights | Full Percent DD |
| 7 | VCF-FinTech Early Payment | RF, DD | VCF and FinTech pool Early Payment in VCF, pool pays fee to Buyer for rights | Full Percent DD + Part of DD – part fee to Buyer |
| 8 | VCF Loan | RF | VCF provides loan to Supplier at interest | Fee Percent to Borrower + Earned interest on loan |
| 9 | FinTech Loan | RF | FinTech provides loan to Supplier at interest | Fee Percent to Borrower (Seller) |

FIG. 6 depicts an example embodiment of a hardware architecture block diagram 600 for an example computing or communications device as may be used for any of various example buyer devices, example seller devices, example financial institution devices, example nonfungible token (NFT) devices, notification and/or authentication devices, example state machines, example shipment arrived state machine, example at customs state machine, example pay tax fees computing device, example shipment cleared computing device, example cargo departed port for in country file paperwork state machine event processor, example source device, example shipment event data receiver, example shipment event queue, example start SmartPass, example shipment in transit service, example shipment ready for customs service, example shipment action queue, example edit SmartPass Docs service, example enable doc upload service, example update SmartPass service, example shipment record database state machine, example rule engine, example rule repository, example rule editor, example engine execution core, example reporting subsystem, example SmartPass state diagram execution processors, state machines, example event data feeds, event data input layer devices, SmartPass record devices, Asset state engine devices, SmartPass State rules, rule engine execution, data components, routers, gateways, etc., according to an example embodiment of the present invention FIG. 6 depicts an exemplary schematic block diagram 600 illustrating an exemplary computer/communications device hardware architecture as may be used in various exemplary components of an exemplary embodiment including user devices various example buyer devices, example seller devices, example financial institution devices, example nonfungible token (NFT) devices, notification and/or authentication devices, example SmartHub devices, cryptocurrency exchange devices, as well as example computing devices of users, mobile devices, network communication components, routers, gateways, etc., computer device(s), bank devices, merchant devices, payment service provider devices, other computing or communications devices, routers, application servers, web servers, cloud-based computing devices, communication devices, switches, routers, gateways, telephone devices, mobile devices, content servers, web servers, database servers and/or other application servers, end-user devices, operations center devices, client and/or server devices, network routers, gateways, access points, and the like, according to various exemplary embodiments.

FIG. 6 depicts an exemplary schematic block diagram 600 illustrating an exemplary computer/communications device hardware architecture as may be used in various exemplary components of an exemplary embodiment including mobile devices, wearables, cloud-based computing devices, content servers, web servers, database servers and/or other application servers, according to various exemplary embodiments. Diagram 600 may include any of various exemplary computer systems as may be used as an external computer device, an internal and/or STB or SOC, a mobile device, a wearable, a client, or server, web server, application server, and/or any other of the computing devices included in the other drawings, according to various exemplary embodiments. FIG. 6 depicts an exemplary diagram 600 illustrating an exemplary computer/communications device hardware architecture as may be used in various components of exemplary embodiments of the present invention. FIG. 6 depicts an exemplary view 600 of exemplary computer systems such as those represented in FIGS. 1-6, 7, etc., including devices which may execute various modules, including components, systems, devices, computers, processors, mobile devices, routers, gateways, network devices, other computing and/or network devices, network monitoring and security operations data analysis computing devices which may execute various operating system and software components on such computing devices and/or subsystem devices and hardware/software modules as may be represented by devices implied by, or perform steps illustrated in various flowchart diagrams as illustrated in the figures by elements 101-113, 201-205, 600, 700, etc., as may be used in implementing an exemplary embodiment of the present invention. FIG. 6 depicts an exemplary embodiment of a computer system that may be used in computing devices including those shown and not shown, such as, e.g., but not limited to, service provider computing devices, SmartHub systems, buyer computing devices, supplier computing devices, digital financial services computing devices, public blockchain for proxy NFT computing devices, data repository processing and/or storage computing devices, network devices, communication devices, authentication devices, notification devices, requesting devices, response devices, cryptocurrency exchange related devices, NFT related devices, traditional financial services and/or fiat currency processing computing devices, electronic funds transfer (EFT) related devices, network monitoring and analysis devices of example operations illustrated example environment 700, computing devices 600, devices, servers, application servers, web servers, other wearable and/or mobile devices, sensor capture devices, routers, gateways, data network communication equipment, etc., according to an exemplary embodiment of the present invention. FIG. 6 depicts an exemplary embodiment of a computer system that may be used as client device, a server device (not shown), a network component, router, packet monitor/analyzer, server device, storage, and/or cloud based storage device, application servers, and/or web servers, etc. The present invention (or any part(s) or function(s) thereof) may be implemented using hardware, software, firmware, or a combination thereof and may be implemented in one or more computer systems or other processing systems. In fact, in one exemplary embodiment, the invention may be directed toward one or more computer systems capable of carrying out the functionality described herein. An example of a computer system 600 is shown in FIG. 6, depicting an exemplary embodiment of a block diagram of an exemplary computer system useful for implementing the present invention. Specifically, FIG. 6 illustrates an example computer 600, which in an exemplary embodiment may be, e.g., (but not limited to) a personal computer (PC) system running an operating system such as, e.g., (but not limited to) WINDOWS MOBILE™ for POCKET PC, or MICROSOFT® WINDOWS® NT/98/2000/XP/CE/7/8/10, etc. available from MICROSOFT® Corporation of Redmond, Wash, U.S.A., SOLARIS® from SUN® Microsystems of Santa Clara, Calif, U.S.A, OS/2 from IBM® Corporation of Armonk, N.Y, U.S.A, Mac/OS, Mac OSX, IOS, from APPLE® Corporation of Cupertino, Calif, U.S.A, etc., or any of various versions of UNIX® (a trademark of the Open Group of San Francisco, Calif, USA) including, e.g., LINUX®, UBUNTU, HPUX®, IBM AIX®, and SCO/UNIX®, etc., ANDROID, Android OS is available from Google, JAVA from Oracle, etc. However, the invention may not be limited to these platforms. Instead, the invention may be implemented on any appropriate computer system running any appropriate operating system. In one exemplary embodiment, the present invention may be implemented on a computer system operating as discussed herein. An exemplary computer system, computer 600 is shown in FIG. 6. Other components of the invention, such as, e.g., (but not limited to) a computing device, a communications device, a telephone, a personal digital assistant (PDA), a personal computer (PC), a handheld PC, client workstations, thin clients, thick clients, proxy servers, network communication servers, remote access devices, client computers, server computers, routers, web servers, data, media, audio, video, telephony or streaming technology servers, a tablet, a phone, a mobile phone, a cellular phone, a communications device, an iPhone, iOS, a smartphone, an iPad, a tablet based device, an ANDROID OS device, an iOS device, a Symbian based device, a Windows 8, 10, 11, etc., device, etc., may also be implemented using a computer such as that shown in FIG. 6.

The computer system 600 may include one or more processors, such as, e.g., but not limited to, processor(s) 604, which may include microprocessors, coprocessors, nanoprocessors, microcontrollers, systems on a chip (SOC), multi-processor systems, parallel processors, CISC type processors, RISC type processors, POWER type processors, ARM-architecture processors, massively parallel processor, graphic processors (GPUs) 632, cryptographic processors such as, e.g., but not limited to, encryption/decryption processor 636, quantum computers, etc. The processor(s) 604 may be connected to a communication infrastructure 606 (e.g., but not limited to, a communications bus, cross-over bar, or network, etc.). Various exemplary software embodiments may be described in terms of this exemplary computer system. After reading this description, it will become apparent to a person skilled in the relevant art(s) how to implement the invention using other computer systems and/or architectures.

Computer system 600 may include a display interface 602 that may forward, e.g., but not limited to, graphics, text, and other data, etc., from the communication infrastructure 606 (or from a frame buffer, etc., not shown) for display on the display unit 630, and/or GPU 632, and/or touchscreen 634, and/or other input or output, and/or input and output device, sensor-based device, etc.

The computer system 600 may also include, e.g., but may not be limited to, a main memory 608, random access memory (RAM), and a secondary memory 610, etc. The secondary memory 610 may include, for example, (but not limited to) a hard disk drive 612 and/or a removable storage drive 614, representing a floppy diskette drive, a magnetic tape drive, an optical disk drive, a compact disk drive CD-ROM, DVD, Personal Cloud storage, redundant array of inexpensive disks (RAID) array, etc. The removable storage drive 614 may, e.g., but not limited to, read from and/or write to a removable storage unit 618 in a well-known manner. Removable storage unit 618, also called a program storage device or a computer program product, may represent, e.g., but not limited to, a floppy disk, magnetic tape, optical disk, compact disk, etc. which may be read from and written to by removable storage drive 614. As will be appreciated, the removable storage unit 618 may include a computer usable storage medium having stored therein computer software and/or data.

In alternative exemplary embodiments, secondary memory 610 may include other similar devices for allowing computer programs or other instructions to be loaded into computer system 600. Such devices may include, for example, but not limited to, a removable storage unit 622 and an interface 620. Examples of such may include a program cartridge and cartridge interface (such as, e.g., but not limited to, those found in video game devices), a removable memory chip (such as, e.g., but not limited to, an erasable programmable read only memory (EPROM), or programmable read only memory (PROM) and associated socket, FLASH memory, application specific integrated circuits (ASICs), field programmable gate arrays (FPGAs), and/or other removable storage units 622 and interfaces 620, which may allow software and/or data to be transferred from the removable storage unit 622 to computer system 600.

The computing device 600 may also include a cloud-accessible or cloud-based processing and/or storage solution as may be available from Amazon Web Services available from Amazon of Seattle, WA USA, or Azure cloud available from Microsoft Corporation of Redmond, WA USA, or Google Cloud Service available from Google of Alphabet Corporation, Mountain View, CA USA, among many other network and software communications offerings available from IBM Corporation, Oracle Corporation, and others.

Computer 600 may also include an input device such as, e.g., (but not limited to) a mouse or other pointing device such as a digitizer, touch-based sensor, and/or a keyboard and/or other data entry device (none of which are labeled).

Computer 600 may also include output devices, such as, e.g., (but not limited to) display 630, and display interface 602. Computer 600 may include input/output (I/O) devices such as, e.g., (but not limited to) communications interface 624, cable 628 and communications path 626, etc. These devices may include, e.g., but not limited to, a network interface card, and modems (neither are labeled). Communications interface 624 may allow software and data to be transferred between computer system 600 and external devices. Examples of communications interface 624 may include, e.g., but may not be limited to, a modem, a network interface (such as, e.g., an Ethernet card), a communications port, a Personal Computer Memory Card International Association (PCMCIA) slot and card, etc. Software and data transferred via communications interface 624 may be in the form of signals 628 which may be electronic, electromagnetic, optical or other signals capable of being received by communications interface 624. These signals 628 may be provided to communications interface 624 via, e.g., but not limited to, a communications path 626 (e.g., but not limited to, a channel). This channel 626 may carry signals 628, which may include, e.g., but not limited to, propagated signals, which may be stored in nontransitory form, and may be implemented using, e.g., but not limited to, wire or cable, local and/or wide area network (LAN/WAN) protocols, Ethernet, Token Ring, FDDI, carried over andy of various physical media, fiber optics, a telephone line, twisted pair, shielded twisted pair, a cellular link, a radio frequency (RF)

link, wireless communications, spread spectrum, orthogonal frequency division multiplexing (OFDM), and/or other communications channels, etc.

In this document, the terms "computer program medium" and "computer readable medium" may be used to generally refer to media such as, e.g., but not limited to removable storage drive 614, a hard disk installed in hard disk drive 612, and signals 628, etc. These computer program products may provide software to computer system 600. The invention may be directed to such computer program products.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct or indirect physical or electrical contact with each other. "Coupled" may mean that two or more elements are in direct physical or electrical contact. However, "coupled" may also mean that two or more elements are not in direct contact with each other, but yet still co-operate or interact with each other.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory. A "computing platform" may may include one or more processors.

Embodiments of the present invention may include apparatuses for performing the operations herein. An apparatus may be specially constructed for the desired purposes, or it may may include a general purpose device modified as set forth herein to perform the processing as described to be selectively activated or reconfigured by a software program stored in the device to become a special purpose device capable of performing the subsystem's or submodule's performance functionality and computer and communications systems instructions, and/or by hardware processing such as, e.g., but not limited to, performing certain trusted platform system processing, including exemplary key based encryption/decryption, network monitoring, packet inspection and the like, according to exemplary embodiments.

Embodiments of the invention may be implemented in one or a combination of hardware, firmware, and software. Embodiments of the invention may also be implemented as instructions stored on a machine-readable medium, which may be read and executed by a computing platform to perform the operations described herein. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; flash memory devices; electrical, optical, acoustical or other form of propagated signals (e.g., carrier waves, infrared signals, digital signals, etc.) when nontransitory, and others.

Computer programs (also called computer control logic), may include object-oriented computer programs, and may be stored in main memory 608 and/or the secondary memory 610 and/or removable storage units 614, also called computer program products. Such computer programs, when executed, may enable the computer system 600 to perform the features of the present invention as discussed herein. In particular, the computer programs, when executed, may enable the processor 604 to provide a method to resolve conflicts during data synchronization according to an exemplary embodiment of the present invention. Accordingly, such computer programs may represent controllers of the computer system 600.

Various artificial intelligence based analysis techniques may be used herein including neural networks, machine learning, any of various well-known AI and ML techniques and processes (e.g., reinforcement learning, dynamic programming, state action reward state action (SARSA), q learning, supervised learning, unsupervised learning, large language models (LLMs), natural language search and interactive request and response, neural networks, convolutional neural networks, statistical heuristics, topic identification and classification, linguistics and semantic processing, tensorflow and openAI libraries, cloud computing services, specific APIs, Microsoft cognitive services, Google cloud AI, Watson AI, offerings from Amazon, Facebook, Baidu, Apple, and others, etc.), and output of such algorithms may be analyzed further as set forth herein to obtain feature vectors and other data which may be used to provide further guidance to users, and/or be integrated for further processing and analysis, authentication, access control, and/or encryption/decryption processing, and coupled via decision support systems, executive information systems, and other graphical user interface enabled network and cyber security monitoring and threat analysis management and processing.

In another exemplary embodiment, the invention may be directed to a computer program product may include a computer readable medium having control logic (computer software) stored therein. The control logic, when executed by the processor 604, may cause the processor 604 to perform the functions of the invention as described herein. In another exemplary embodiment where the invention may be implemented using software, the software may be stored in a computer program product and loaded into computer system 600 using, e.g., but not limited to, removable storage drive 614, hard drive 612 or communications interface 624, etc. The control logic (software), when executed by the processor 604, may cause the processor 604 to perform the functions of the invention as described herein. The computer software may run as a standalone software application program running atop an operating system or may be integrated into the operating system.

In yet another embodiment, the invention may be implemented primarily in hardware using, for example, but not limited to, hardware components such as application specific integrated circuits (ASICs), or one or more state machines, etc. Implementation of the hardware state machine so as to perform the functions described herein will be apparent to persons skilled in the relevant art(s).

In another exemplary embodiment, the invention may be implemented primarily in firmware.

In yet another exemplary embodiment, the invention may be implemented using a combination of any of, e.g., but not limited to, hardware, firmware, and software, etc.

Exemplary embodiments of the invention may also be implemented as instructions stored on a machine-readable medium, which may be read and executed by a computing platform to perform the operations described herein. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; flash memory devices; electrical, optical, acoustical or other form of propagated signals (e.g., carrier waves, infrared signals, digital signals, etc.), and others.

According to an exemplary embodiment, the application system can include an electronic decision support system (DSS) (not shown), policy-based trust platform systems, which can interact, e.g., but not limited to, with computer database management system (DBMS) 607, and/or electronic interactive, graphical user interface (GUI) system. Each of the exemplary DSS, DBMS and/or EIGUI system, can then, using e.g., but not limited to, a cryptographic processor and/or a crypto chip controller processor 636, or the like, can then encrypt the data using electronic encryptor, which can make use of one or more cryptographic algorithm electronic logic, which can include encryption code, a cryptographic combiner, etc., and may be stored in encrypted form, according to an exemplary embodiment, in a computer database storage facility, from computer database storage device, and from there the process can continue with use of the cryptographic algorithm electronic logic, and electronic decryptor, which can decrypt and/or provide a process for decrypting encrypted data, and/or by providing such data to the DSS, the DBMS, or the EIGUI, if authorized. By using encryption/decryption, certain algorithms can be used, as described herein, including, e.g., but not limited to, checksum, AES encryption, RSA, PKI, TLS, FTPS, SFTP, etc. and/or other cryptographic algorithms and/or protocols, according to exemplary embodiments.

Cryptographic Functions

Cryptographic systems, according to an exemplary embodiment, can provide one or more of the following four example services. It is important to distinguish between these, as some algorithms are more suited to particular tasks, but not to others. To protect patient data, personal data can be encrypted prior to storage and can be decrypted before accessing the data, according to an exemplary embodiment. When analyzing requirements and risks, one needs to decide which of the four functions should be used to protect the proprietary data, according to an exemplary embodiment.

Authentication

Using a cryptographic system, according to an exemplary embodiment, one can establish the identity of a remote user (or system). A typical example is the SSL certificate of a web server providing proof to the user device that user device is connected to the correct server, according to an exemplary embodiment.

The identity is not of the user, but of the cryptographic key of the user. Having a less secure key lowers the trust one can place on the identity, according to an exemplary embodiment.

Non-Repudiation

The concept of non-repudiation is particularly important for financial or e-commerce applications, according to an exemplary embodiment. Often, cryptographic tools are required to prove that a unique user has made a transaction request, according to an exemplary embodiment. It must not be possible for the user to refute his or her actions, according to an exemplary embodiment.

For example, a customer can request a transfer of money from her account to be paid to another account, according to an exemplary embodiment. Later, she claims never to have made the request and demands the money be refunded to the account. If one has non-repudiation through cryptography, one can prove-usually through digitally signing the transaction request, that the user authorized the transaction.

Confidentiality

More commonly, the biggest concern can be to keep information private, according to an exemplary embodiment. Cryptographic systems, according to an exemplary embodiment, have been developed to function in this capacity. Whether it be passwords sent during a log on process, or storing confidential proprietary financial data in a database, encryption can assure that only users who have access to the appropriate key can get access to the proprietary data.

Integrity

One can use cryptography, according to an exemplary embodiment, to provide a means to ensure data is not viewed or altered during storage or transmission. Cryptographic hashes for example, can safeguard data by providing a secure checksum, according to an exemplary embodiment.

Cryptographic Algorithms

Various types of cryptographic systems exist that have different strengths and weaknesses, according to an exemplary embodiment. Typically, the exemplary cryptographic systems can be divided into two classes; 1) those that are strong, but slow to run, and 2) those that are quick, but less secure. Most often a combination of the two approaches can be used, according to an exemplary embodiment (e.g.: secure socket layer (SSL)), whereby we establish the connection with a secure algorithm, and then if successful, encrypt the actual transmission with the weaker, but much faster algorithm.

Symmetric Cryptography

Symmetric Cryptography, according to an exemplary embodiment, is the most traditional form of cryptography. In a symmetric cryptosystem, the involved parties share a common secret (password, pass phrase, or key), according to an exemplary embodiment. Data can be encrypted and decrypted using the same key, according to an exemplary embodiment. These symmetric cryptography algorithms tend to be comparatively fast, but the algorithms cannot be used unless the involved parties have already exchanged keys, according to an exemplary embodiment. Any party possessing a specific key can create encrypted messages using that key as well as decrypt any messages encrypted with the key, according to an exemplary embodiment. In systems involving a number of users who each need to set up independent, secure communication channels, symmetric cryptosystems can have practical limitations due to the requirement to securely distribute and manage large numbers of keys, according to an exemplary embodiment.

Common examples of symmetric algorithms include, e.g., but not limited to, DES, 3DES and/or AES, etc. The 56-bit keys used in DES are short enough to be easily brute-forced by modern hardware and DES should no longer be used, according to an exemplary embodiment. Triple DES (or 3DES) uses the same algorithm, applied three times with different keys giving it an effective key length of 128 bits, according to an exemplary embodiment. Due to the problems using the DES algorithm, the United States National Institute of Standards and Technology (NIST) hosted a selection process for a new algorithm. The winning algorithm was Rijndael and the associated cryptosystem is now known as the Advanced Encryption Standard or AES, according to an exemplary embodiment. For most applications 3DES, according to an exemplary embodiment, is acceptably secure at the current time, but for most new applications it is advisable to use AES, according to an exemplary embodiment.

Asymmetric Cryptography (Also Called Public/Private Key Cryptography)

Asymmetric algorithms, according to an exemplary embodiment, use two keys, one to encrypt the data, and either key to decrypt. These inter-dependent keys are generated together, according to an exemplary embodiment. One key is labeled the Public key and is distributed freely, according to an exemplary embodiment. The other key is labeled the Private Key and must be kept hidden, according to an exemplary embodiment. Often referred to as Public/Private Key Cryptography, these cryptosystems can provide a number of different functions depending on how they are used, according to an exemplary embodiment.

The most common usage of asymmetric cryptography is to send messages with a guarantee of confidentiality, according to an exemplary embodiment. If User A wanted to send a message to User B, User A would get access to User B's publicly available Public Key, according to an exemplary embodiment. The message is then encrypted with this key and sent to User B, according to an exemplary embodiment. Because of the cryptosystem's property that messages encoded with the Public Key of User B can only be decrypted with User B's Private Key, only User B can read the message, according to an exemplary embodiment.

Another usage scenario is one where User A wants to send User B a message and wants User B to have a guarantee that the message was sent by User A, according to an exemplary embodiment. In order to accomplish this, User A can encrypt the message with their Private Key, according to an exemplary embodiment. The message can then only be decrypted using User A's Public Key, according to an exemplary embodiment. This can guarantee that User A created the message because User A is then the only entity who had access to the Private Key required to create a message that can be decrypted by User A's Public Key, according to an exemplary embodiment. This is essentially a digital signature guaranteeing that the message was created by User A, according to an exemplary embodiment.

A Certificate Authority (CA), whose public certificates are installed with browsers or otherwise commonly available, may also digitally sign public keys or certificates, according to an exemplary embodiment. One can authenticate remote systems or users via a mutual trust of an issuing CA, according to an exemplary embodiment. One can trust their 'root' certificates, according to an exemplary embodiment, which in turn authenticates the public certificate presented by the server.

PGP and SSL are prime examples of systems implementing asymmetric cryptography, using RSA and/or other algorithms, according to an exemplary embodiment.

Hashes

Hash functions, according to an exemplary embodiment, take some data of an arbitrary length (and possibly a key or password) and generate a fixed-length hash based on this input. Hash functions used in cryptography have the property that it can be easy to calculate the hash, but difficult or impossible to re-generate the original input if only the hash value is known, according to an exemplary embodiment. In addition, hash functions useful for cryptography have the property that it is difficult to craft an initial input such that the hash will match a specific desired value, according to an exemplary embodiment.

MD5 and SHA-1 are common hashing algorithms, according to an exemplary embodiment. These algorithms are considered weak and are likely to be replaced in due time after a process similar to the AES selection, according to an exemplary embodiment. New applications should consider using SHA-256 instead of these weaker algorithms, according to an exemplary embodiment.

Key Exchange Algorithms

There are also key exchange algorithms (such as Diffie-Hellman for SSL), according to an exemplary embodiment. These key exchange algorithms can allow use to safely exchange encryption keys with an unknown party, according to an exemplary embodiment.

Algorithm Selection

As modern cryptography relies on being computationally expensive to break, according to an exemplary embodiment, specific standards can be set for key sizes that can provide assurance that with today's technology and understanding, it will take too long to decrypt a message by attempting all possible keys, according to an exemplary embodiment.

Therefore, we need to ensure that both the algorithm and the key size are taken into account when selecting an algorithm, according to an exemplary embodiment.

FIG. 7 depicts an example application server and web server network architecture including an example fully meshed, redundant communications network load balancing application server architecture as may be used for an example SmartHub system service provider and/or a digital financial services and/or payment service provider, and may couple client devices such as, e.g., but not limited to, service provider, buyer devices, supplier devices, public blockchain, proxy NFT systems, data repository systems, authentication systems, ledger tracking systems, blockchain distributed ledge systems, NFT systems, SmartPass NFT authentication systems, notification systems, request response systems, financing request systems, collateralized NFT request response systems, etc. to example service devices using an example network infrastructure, according to an example embodiment of the present invention. FIG. 7 depicts an exemplary schematic block diagram 700 illustrating an exemplary communications network device hardware architecture 700 showing exemplary network devices including exemplary application server devices 702, exemplary storage devices 706, web server devices 708, all coupled to an exemplary communications network 704, which may be coupled to other devices such as, e.g., but not limited to, a cyber security network security operations environment device or devices 704, and other end user and other internal and/or external user computing and/or communications devices 710, which may be coupled to the network communications environment 704 by one or more physical devices not shown, such as, e.g., but not limited to, network interface cards (NICs), wireless local area network WLAN or wireless fidelity (WI-FI) (IEEE 802.11 communication technologies), physical wires, twisted pair, coaxial cable, fiber optic cable, and/or other communications network cabling, wireless communication access points and/or wireless antennae, wires, wireless media, routers, gateways, access points, exchange carrier facilities, modulator/demodulator (modems), modulating equipment, cellular network exchange devices, etc. Block diagram 700 may serve as an exemplary logical diagram of associated physical devices. Physical devices may communicate via one or more communications network software protocols via exemplary protocol languages or stacks which may correlate to the Open Systems Interconnect (OSI) stack of communication layers, such as, e.g., but not limited to, Internet Protocol (IP), transmission control protocol (TCP), among various other protocols including, e.g., but not limited to, TCP/IP protocols, UDP, hypertext transfer protocol (HTTP), file transfer protocol (FTP), security protocols (e.g., HTTPS, SFTP, FTPS, TLS, etc.), as will be apparent to those skilled in the relevant art. Various load sharing devices and port sharing devices may be used, as well as protocol tracing and packet tracing devices, which may be able to access such communications data and perform exemplary processing including packet inspection, deep packet inspection, network tracing, packet inspection (e.g., source and destination address, etc.) and the like. Such systems may be used to perform various block chain related distributed ledger technologies so as to replicate data which may be encrypted and decrypted using various algorithms. Certain algorithms may be used which may be resilient to conventional decryption techniques, resilient to brute force attack decryption techniques, and/or may be resilient to quantum computing based decryption techniques. Such software and hardware network analysis and/or processing tools may be used to process communications network traffic internal to, and/or external from an exemplary entity organization and an exemplary network operations center (NOC) network monitoring organization may be able to analyze such network traffic to, e.g., process different types of traffic, using various sophisticated network operations tools and techniques as well as to perform various automated processing as described further herein.

Although example embodiments of the invention are illustrated and described herein as embodied in an example embodiment, the invention should not be limited to the details shown in those example embodiments because various modifications and structural changes may be made without departing from the spirit of the invention while remaining within the scope and range of equivalents of the claims.

The construction and method of operation of various example embodiments of the claimed invention and additional features and/or advantages of various example embodiments of the invention are best understood from the following description of specific example embodiments when read in connection with the accompanying drawings.

Various exemplary embodiments of the invention are discussed in detail herein. While specific exemplary embodiments are discussed herein, it should be understood that this is done for illustration purposes only. A person skilled in the relevant art will recognize that other components and configurations can be used without parting from the spirit and scope of the invention.

What is claimed is:

1. A computer implemented electronic method of electronically processing at least one electronic early payment financing electronic request, electronically enabling at least or more of at least one electronic dynamic discounting (DD) or at least one electronic reverse factoring (RF) financing, via at least one electronic SmartHub finance processor (SHFP) device comprising at least one electronic computer processor coupled to at least one electronic memory storage device and coupled via at least one electronic communications interface to at least one electronic data communications network, the method comprising:

electronically receiving, by the at least one electronic computer processor of the at least one electronic SHFP device, at least one electronic request for the at least one electronic early payment financing request from an electronic supplier party device over the at least one electronic data communications network;

electronically processing, by the at least one electronic computer processor of the at least one electronic SHFP device, the at least one electronic request by electronically performing a plurality of electronic processing instructions comprising at least one or more of:

electronically accessing, by the at least one electronic computer processor of the at least one electronic SHFP device, at least one electronic asset, electronic non-fungible token (NFT) electronic repository;

electronically receiving, by the at least one electronic computer processor of the at least one electronic SHFP device, at least one electronic risk management model;

electronically notarizing, by the at least one electronic computer processor of the at least one electronic SHFP device, at least one electronic NFT proxy package to at least one local electronic NFT blockchain electronic repository;

electronically notarizing and electronically collateralizing, by the at least one electronic computer processor of the at least one electronic SHFP device, at least one electronic NFT proxy package to at least one electronic restricted access public electronic NFT blockchain electronic repository;

electronically binding the electronic Dynamic Discounting (DD) electronic NFT to the electronic NFT, electronically ensuring an electronic secure and electronically unbreakable digital linkage;

electronically notifying, by the at least one electronic computer processor of the at least one electronic SHFP device, at least one electronic payment network;

electronically verifying, by the at least one electronic computer processor of the at least one SHFP, the electronic NFT to the at least one local electronic NFT blockchain electronic repository; or electronically responding, by the at least one electronic computer processor of the at least one electronic SHFP device, to the at least one electronic early payment financing request to the electronic supplier party device; and electronically providing an electronic dynamic discounting (DD) rights electronic non- fungible token (NFT), comprising:

electronically enabling electronically acquiring or electronically trading of electronic data indicative of rights to electronically participate in electronic dynamic discounting; and electronically enabling making electronic independent early payment arrangement with an electronic supplier party device that do not directly involve an electronic buyer party device.

2. The method according to claim 1, wherein said electronically notifying, by the at least one electronic computer processor of the at least one electronic SHFP device, of the at least one electronic early payment network, comprises:

wherein the at least one electronic early payment network in turn electronically proceeds to electronically notify at least one or more of:

at least one electronic fintech finance market device;

at least one electronic value chain finance exchange device;

at least one electronic DeFi Market device; or at least one electronic buyer party device.

3. The method according to claim 1, wherein said electronically processing, by the at least one electronic computer processor of the at least one electronic SHFP device, the at least one electronic request by the electronically performing said plurality of electronic processing instructions comprises:

electronically accessing, by the at least one electronic computer processor of the at least one electronic SHFP device, at least one asset, electronic non-fungible token (NFT) electronic repository;

electronically receiving, by the at least one electronic computer processor of the at least one electronic SHFP device, at least one electronic risk management model;

electronically notarizing, by the at least one electronic computer processor of the at least one electronic SHFP device, at least one electronic NFT proxy package to at least one local electronic NFT blockchain electronic repository;

electronically notarizing and electronically collateralizing, by the at least one electronic computer processor of the at least one electronic SHFP, at least one electronic NFT proxy package to at least one electronic restricted access public electronic NFT blockchain electronic repository;

electronically binding the electronic Dynamic Discounting (DD) electronic NFT to the electronic NFT, ensuring an electronically secure and electronically unbreakable digital linkage;

electronically notifying, by the at least one electronic computer processor of the at least one electronic SHFP device, at least one or more of:

at least one electronic early payment network, wherein the at least one electronic early payment network in turn electronically proceeds to electronically notify:

at least one electronic fintech finance market device;

at least one electronic value chain finance exchange device;

at least one electronic DeFi Market device; and at least one electronic buyer party device;

electronically verifying, by the at least one electronic computer processor of the at least one electronic SHFP device, the electronic NFT to the at least one local electronic NFT blockchain electronic repository; and electronically responding, by the at least one electronic computer processor of the at least one electronic SHFP device, to the at least one electronic early payment financing request to the electronic supplier party device.

4. The method according to claim 1, wherein an electronic party device in the electronic role of an electronic borrower device of electronic funds to electronically request of electronic funds by electronically presenting electronic digital collateral in the form of an electronic NFT, an electronic supply chain electronic digital track and electronic trace electronic artifact, and for electronic other Parties devices, in the electronic role of an electronic financer device or an electronic lender device, to electronically verify the electronic digital collateral to electronically process the electronic request of electronic funds and electronically provide electronic bids to the electronic borrower device for electronic bid acceptance by the electronic borrower device with a electronic digital agreement for electronic funds electronic transfer, the method further comprises:

electronically registering the electronic financer device and the electronic lender device;

electronically providing electronic secured access to electronic borrower device electronic opportunities;

electronically verifying electronic digital collateral using at least one electronic blockchain transaction;

electronically securing the electronic digital collateral; and electronically ensuring the electronic digital collateral is electronically authentic through at least one or more of:

electronically authenticating at least one electronic digital signature; or electronically authenticating by using electronic blockchain storage.

5. The method according to claim 4, further comprising:

electronically processing electronic agreements for electronic funds between the electronic financer device and the electronic borrower device;

electronically transferring electronic funds and electronic cryptocurrency funds from the electronic financer device to the electronic borrower device;

electronically assessing electronic data indicative of electronic fees and electronic interest; and electronically processing electronic payments from the electronic borrowers devices for electronic loan agreements.

6. The method according to claim 5, further comprising:

electronically providing several types of electronic agreements with electronic terms that the electronic borrower device may electronically select an electronic selection choice to electronically accept that involve electronic financial mechanisms comprising at least one or more of:

electronic forward and electronic reverse factoring (RF);

electronic dynamic discounting (DD); or electronic loan terms.

7. An electronic system of electronically processing at least one electronic early payment financing request, electronically enabling at least or more of at least one electronic dynamic discounting (DD) or at least one electronic reverse factoring (RF) financing, the electronic system comprising:

at least one electronic SmartHub finance processor (SHFP) device comprising:

at least one electronic computer processor;

at least one electronic memory storage device coupled to said at least one electronic computer processor; and at least one electronic communications interface coupled to said at least one electronic computer processor and coupled to at least one electronic data communications network, wherein said at least one electronic computer processor of said at least one electronic SHFP device is configured to:

electronically receive at least one electronic request for the at least one electronic early payment financing request from an electronic supplier party device over the at least one electronic data communications network; and electronically process the at least one electronic request by being electronically configured to electronically perform a plurality of electronic processing instructions comprising wherein the at least one electronic computer processor is electronically configured to at least one or more of:

electronically access at least one electronic asset, electronic non-fungible token (NFT) electronic repository;

electronically receive at least one electronic risk management model;

electronically notarize at least one electronic NFT proxy package to at least one local electronic NFT blockchain electronic repository;

electronically notarize and electronically collateralize at least one electronic NFT proxy package to at least one electronic restricted access public electronic NFT blockchain electronic repository;

electronically bind the electronic Dynamic Discounting (DD) electronic NFT to the electronic NFT, ensuring an electronically secure and electronic unbreakable digital linkage;

electronically notify:

at least one electronic early payment network;

electronically verify the electronic NFT to the at least one local electronic NFT blockchain electronic repository; or electronically respond to the at least one electronic early payment financing request to the electronic supplier party device; and wherein said at least one electronic computer processor of said at least one electronic SHFP device is configured to:

electronically provide an electronic dynamic discounting (DD) rights electronic non- fungible token (NFT), comprising wherein said at least one electronic computer processor of said at least one electronic SHFP device is configured to:

electronically enable electronically acquire or electronically trade of electronic data indicative of rights to electronically participate in electronic dynamic discounting; and electronically enable to make electronic independent early payment arrangement with an electronic supplier party device that do not directly involve an electronic buyer party device.

8. The system according to claim 7, wherein said electronically notify said at least one electronic early payment network, comprises wherein the at least one electronic early payment network is in turn electronically configured to electronically proceed to electronically notify at least one or more of:

at least one electronic fintech finance market device;

at least one electronic value chain finance exchange device;

at least one electronic DeFi Market device; or at least one electronic buyer party device.

9. The system according to claim 7, wherein said electronically process the at least one electronic request by being electronically configured to electronically perform a plurality of electronic processing instructions comprising wherein the at least one electronic computer processor is configured to:

electronically access at least one electronic asset, electronic non-fungible token (NFT) electronic repository;

electronically receive at least one electronic risk management model;

electronically notarize at least one electronic NFT proxy package to at least one local electronic NFT blockchain electronic repository;

electronically notarize and electronically collateralize at least one electronic NFT proxy package to at least one restricted access public electronic NFT blockchain electronic repository;

electronically bind the electronic Dynamic Discounting (DD) NFT to the electronic NFT, ensuring an electronically secure and electronically unbreakable electronic digital linkage;

electronically notify at least one or more of:

at least one electronic early payment network, wherein the at least one electronic early payment network in turn is configured to electronically proceed to electronically notify:

at least one electronic fintech finance market device;

at least one electronic value chain finance exchange device;

at least one electronic DeFi Market device; and at least one electronic buyer party device;

electronically verify the electronic NFT to the at least one local electronic NFT blockchain electronic repository; and electronically respond to the at least one electronic early payment financing request to the electronic supplier party device.

10. The system according to claim 7, wherein an electronic party device in the electronic role of an electronic borrower device of electronic funds to electronically request of electronic funds by electronically presenting electronic digital collateral in the form of a electronic NFT, an electronic supply chain electronic digital track and electronic trace electronic artifact, and for electronic other Parties devices, in the electronic role of an electronic financer device or an electronic lender device, to electronically verify the electronic digital collateral to electronically process the electronic request of electronic funds and electronically provide electronic bids to the electronic borrower device for electronic bid acceptance by the electronic borrower device with an electronic digital agreement for electronic funds transfer, wherein the electronic system is further configured to:

electronically register the electronic financer device and the electronic lender device;

electronically provide secured electronic access to electronic borrower device opportunities;

electronically verify electronic digital collateral electronic using at least one electronic blockchain transaction;

electronically secure the electronic digital collateral;

electronically ensure the electronic digital collateral is electronically authentic through at least one or more of:

electronically authenticate at least one electronic digital signature; or electronically authenticate by using electronic blockchain electronic storage;

electronically process agreements for electronic funds between the electronic financer device and the electronic borrower device;

electronically transfer electronic data indicative of electronic funds and electronic cryptocurrency funds from the electronic financer device to the electronic borrower device;

electronically assess electronic data indicative of electronic fees and electronic interest;

electronically process electronic payments from the electronic borrowers devices for electronic loan agreements;

electronically provide several types of electronic agreements with electronic terms that the borrower may electronically select an electronic selection choice to electronically accept that involve electronic financial mechanisms comprising at least one or more of:

electronic forward and electronic reverse factoring (RF);

electronic dynamic discounting (DD); or electronic loan terms; and electronically provide an electronic dynamic discounting (DD) rights electronic non-fungible token (NFT), comprising:

electronically enable electronic acquisition or electronic trade of rights to electronically participate in electronic dynamic discounting; and electronically enable electronic execution of an independent electronic early payment arrangement with an electronic supplier party device that do not directly involve a electronic buyer party device.

11. A nontransitory, computer program product, embodied on at least one computer accessible medium, comprising at least one computer program instruction, which when electronically executed on at least one electronic computer processor, performs an electronic method of electronically processing at least one electronic early payment financing request, electronically enabling at least or more of at least one electronic dynamic discounting (DD) or at least one electronic reverse factoring (RF) financing, via at least one electronic SmartHub finance processor (SHFP) device comprising at least one electronic computer processor coupled to at least one electronic memory storage device and coupled via at least one electronic communications interface to at least one electronic data communications network, the computer program product comprising the electronic method comprising:

electronically receiving, by the at least one electronic computer processor of the at least one electronic SHFP device, at least one electronic request for the at least one electronic early payment financing request from an electronic supplier party device over the at least one electronic data communications network; and electronically processing, by the at least one electronic computer processor of the at least one electronic SHFP device, the at least one electronic request by electronically performing a plurality of electronic processing instructions comprising at least one or more of:

electronically accessing, by the at least one electronic computer processor of the at least one electronic SHFP device, at least one electronic asset, electronic non-fungible token (NFT) electronic repository;

electronically receiving, by the at least one electronic computer processor of the at least one electronic SHFP device, at least one electronic risk management model;

electronically notarizing, by the at least one electronic computer processor of the at least one electronic SHFP device, at least one electronic NFT proxy package to at least one local electronic NFT blockchain electronic repository;

electronically notarizing and electronically collateralizing, by the at least one electronic computer processor of the at least one electronic SHFP device, at least one electronic NFT proxy package to at least one electronic restricted access public electronic NFT blockchain electronic repository;

electronically binding the electronic Dynamic Discounting (DD) NFT to the electronic NFT, ensuring an electronically secure and electronically unbreakable electronic digital linkage;

electronically notifying, by the at least one electronic computer processor of the at least one electronic SHFP device,;

electronically verifying, by the at least one electronic computer processor of the at least one electronic SHFP device, the electronic NFT to the at least one local electronic NFT blockchain electronic repository; or electronically responding, by the at least one electronic computer processor of the at least one electronic SHFP device, to the at least one electronic early payment financing request to the electronic supplier party device; and electronically providing an electronic dynamic discounting (DD) rights electronic non- fungible token (NFT), comprising:

electronically enabling electronically acquiring or electronically trading of electronic data indicative of rights to electronically participate in electronic dynamic discounting; and electronically enabling making electronic independent early payment arrangement with an electronic supplier party device that do not directly involve an electronic buyer party device.

12. The computer program product according to claim 11, wherein the method comprises wherein said electronically notifying, by the at least one electronic computer processor of the at least one electronic SHFP device, of the at least one electronic early payment network, comprises wherein the at least one electronic early payment network in turn electronically proceeds to electronically notify at least one or more of:

at least one electronic fintech finance market device;

at least one electronic value chain finance exchange device;

at least one electronic DeFi Market device; or at least one electronic buyer party device.

13. The computer program product according to claim 11, wherein the method comprises wherein said electronically processing, by the at least one electronic computer processor of the at least one electronic SHFP device, the at least one electronic request by the electronically performing said plurality of electronic processing instructions comprises:

electronically accessing, by the at least one electronic computer processor of the at least one electronic SHFP device, at least one electronic asset, electronic non-fungible token (NFT) electronic repository;

electronically receiving, by the at least one electronic computer processor of the at least one electronic SHFP device, at least one electronic risk management model;

electronically notarizing, by the at least one electronic computer processor of the at least one electronic SHFP device, at least one electronic NFT proxy package to at least one local electronic NFT blockchain electronic repository;

electronically notarizing and electronically collateralizing, by the at least one electronic computer processor of the at least one electronic SHFP device, at least one electronic NFT proxy package to at least one electronic restricted access public electronic NFT blockchain electronic repository;

electronically binding the electronic Dynamic Discounting (DD) NFT to the electronic NFT, electronically ensuring an electronically secure and electronically unbreakable electronic digital linkage;

electronically notifying, by the at least one electronic computer processor of the at least one electronic SHFP device:

at least one electronic early payment network, wherein the at least one electronic early payment network in turn electronically proceeds to electronically notify:

at least one electronic fintech finance market device;

at least one electronic value chain finance exchange device;

at least one electronic DeFi Market device; and at least one electronic buyer party device;

electronically verifying, by the at least one electronic computer processor of the at least one electronic SHFP device, the electronic NFT to the at least one local electronic NFT blockchain electronic repository; and electronically responding, by the at least one electronic computer processor of the at least one electronic SHFP device, to the at least one electronic early payment financing request to the electronic supplier party device.

14. The computer program product according to claim 11, wherein the electronic method comprises wherein an electronic party in the electronic role of an electronic borrower of electronic funds to electronically request of electronic funds by electronically presenting electronic digital collateral in the form of an electronic NFT, an electronic supply chain digital electronic track and electronic trace electronic artifact, and for other electronic Parties devices, in the electronic role of an electronic financer or an electronic lender, to electronically verify the electronic digital collateral to electronically process the electronic request of electronic funds and electronically provide electronic bids to the electronic borrower device for electronic bid acceptance by the electronic borrower device with an electronic digital agreement for electronic funds transfer, the electronic method further comprises:

electronically registering the electronic financer device and the electronic lender device;

electronically providing electronically secured access to electronic borrower device opportunities;

electronically verifying electronic digital collateral using at least one electronic blockchain electronic transaction;

electronically securing the electronic digital collateral;

electronically ensuring the electronic digital collateral is authentic electronically through at least one or more of:

electronically authenticating at least one electronic digital signature; or electronically authenticating by electronic using electronic blockchain electronic storage;

electronically processing electronic agreements for electronic funds between the electronic financer device and the electronic borrower device;

electronically transferring electronic funds and electronic cryptocurrency funds from the electronic financer device to the electronic borrower device;

electronically assessing electronic data indicative of electronic fees and electronic interest;

electronically processing electronic data indicative of electronic payments from the electronic borrowers devices for electronic loan agreements;

electronically providing several types of electronic agreements with electronic data indicative of terms that the electronic borrower device may electronically select an electronic selection choice to electronically accept that electronically involve electronic financial mechanisms comprising at least one or more of:

electronic forward and electronic reverse factoring (RF);

electronic dynamic discounting (DD); or electronic loan terms; and electronically providing an electronic dynamic discounting (DD) rights electronic non-fungible token (NFT), comprising:

electronically enabling electronically acquiring or electronically trading of rights to electronically participate in electronic dynamic discounting; and electronically enabling electronically making independent electronic early payment arrangement with an electronic supplier party device that do not directly involve an electronic buyer party device.

15. A computer implemented method for an electronic party device in the electronic role of an electronic borrower device of electronic funds to electronically request electronic funds by electronically presenting electronic digital collateral in the form of an electronic NFT, an electronic supply chain electronic digital track and electronic trace electronic artifact, and for other electronic Parties devices, in the electronic role of an electronic financer device or an electronic lender device, to electronically verify the electronic digital collateral to electronically process the electronic request of electronic funds and electronically provide electronic bids to the electronic borrower device for electronic bid acceptance by the electronic borrower device with a electronic digital agreement for electronic funds transfer, the electronic method comprising:

electronically registering the electronic financer device and the electronic lender device;

electronically providing electronic secured access to electronic borrower device electronic opportunities;

electronically verifying electronic digital collateral using at least one electronic blockchain electronic transaction;

electronically securing the electronic digital collateral; and electronically ensuring the electronic digital collateral is electronically authentic through at least one or more of:

electronically authenticating at least one electronic digital signature; or electronically authenticating by electronically using blockchain storage; and electronically providing an electronic dynamic discounting (DD) rights electronic non-fungible token (NFT), comprising:

electronically enabling electronically acquiring or electronically trading of electronic data indicative of rights to electronically participate in electronic dynamic discounting; and electronically enabling making electronic independent early payment arrangement with an electronic supplier party device that do not directly involve an electronic buyer party device.

16. The method according to claim 15, further comprising:

electronically processing electronic agreements for electronic funds between the electronic financer device and the electronic borrower device;

electronically transferring electronic and cryptocurrency funds from the financer to the borrower;

electronically assessing electronic data indicative of electronic fees and electronic interest; and electronically processing electronic payments from the electronic borrowers devices for electronic loan agreements.

17. The method according to claim 15, further comprising:

electronically providing several types of electronic agreements with electronic terms that the electronic borrower device may electronically select an electronic choice selection to electronically accept that involve electronic financial mechanisms comprising at least one or more of:

electronic forward and reverse factoring (RF);

electronic dynamic discounting (DD); or electronic loan terms.

* * * * *